(12) United States Patent
Hoskins et al.

(10) Patent No.: US 6,792,504 B2
(45) Date of Patent: Sep. 14, 2004

(54) READ ON ARRIVAL SCHEME FOR A DISC DRIVE

(75) Inventors: Edward Sean Hoskins, Longmont, CO (US); Steven Scott Williams, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 162 days.

(21) Appl. No.: 10/160,603

(22) Filed: May 31, 2002

(65) Prior Publication Data
US 2003/0145164 A1 Jul. 31, 2003

Related U.S. Application Data

(60) Provisional application No. 60/351,649, filed on Jan. 25, 2002.

(51) Int. Cl.[7] .............................................. G06F 13/20
(52) U.S. Cl. ..................................................... 711/112
(58) Field of Search .................................. 711/112, 154

(56) References Cited

U.S. PATENT DOCUMENTS

| | | | |
|---|---|---|---|
| 5,283,875 A | 2/1994 | Gibson et al. ............... 395/400 |
| 5,844,911 A | 12/1998 | Schadegg et al. ............ 714/710 |
| 6,185,640 B1 | 2/2001 | Ross ............................. 710/53 |
| 6,330,640 B1 | 12/2001 | Williams et al. ............. 711/112 |
| 6,356,216 B1 | 3/2002 | Chen et al. .................. 341/118 |
| 6,490,651 B1 * | 12/2002 | Shats et al. .................. 711/112 |
| 2001/0028524 A1 | 10/2001 | Hoskins ........................ 360/55 |
| 2001/0032292 A1 | 10/2001 | Hoskins et al. .............. 711/112 |

* cited by examiner

Primary Examiner—Kevin L. Ellis
(74) Attorney, Agent, or Firm—Fish & Richardson, P.C., P.A.

(57) ABSTRACT

A read-on-arrival scheme for reading data stored on a track of a data storage disc is disclosed. The track is divided into a plurality of sequentially arranged data sectors. Each data sector stores a block of data. A host computer issues a read command requesting retrieval of a segment of data blocks stored on a plurality of the data sectors. The segment may include a target data segment as well as a pre-fetch and post-fetch data segment. The read command specifies a target sector that a transducer is to initially access on the track. Upon receipt of the read command, components of a disc drive move the transducer to the track for access of the segment requested in the command. The disc drive components enable the transfer of data regardless of whether the transducer first accesses a sector located in sequential order prior to or following the target sector.

27 Claims, 11 Drawing Sheets

READ ON ARRIVAL SCHEME FOR A DISC DRIVE

RELATED APPLICATIONS

This application claims benefit of priority of U.S. provisional application Serial No. 60/351,649, filed Jan. 25, 2002.

FIELD OF THE INVENTION

The present invention relates generally to a data storage device and more specifically to a method for transferring data between a recordable medium of the data storage device and a host computer.

BACKGROUND OF THE INVENTION

In a disc drive, data are stored on one or more discs coated with a magnetizable medium. Data are written to the discs by an array of transducers, typically referred to as read/write heads, mounted to a radial actuator for movement of the heads relative to the discs. The data are stored on a plurality of concentric circular tracks on the discs until such time that the data are read from the discs by the read/write heads. Each of the concentric tracks is generally divided into a plurality of separately addressable data sectors. The transducers are used to transfer data between a desired track and an external environment, which includes, among many components, a host computer.

During a write operation, data are written onto the disc track. Once data are written to the disc, each sector holds a block of data, which is the absolute smallest quantity that can be written to the disc during a single write operation. Adjacent blocks, commonly referred to as a data segment, are typically written to and read from the disc during a single write operation referred to as a command. Critical to both of these operations—reading and writing—is the accurate locating of a transducer over the center of the desired track. During a read operation, a transducer senses the data previously written on the track and transfers the data to the external environment.

The transfer of files between a disc and a host computer is controlled in a multi-level setting characterized by a bi-level transfer scheme. At a macroscopic level, track sectors are selected that contain the data blocks of the data segments into which the file is divided. More specifically, and in a microscopic sense, cells along a track are magnetized to correspond to the bit structure of the file for the purposes of subsequent reading. A disc drive typically includes a buffer to implement this bi-level transfer scheme. The purpose of the buffer is to accept the blocks of data during transfer between the host computer and the disc and then transfer the data to the proper component—either the host computer or the disc.

One factor to consider in designing disc drives is read latency. Read latency is the time that it takes to write data to and read data from the discs of the disc drive. Disc drive designers are continuously trying to minimize read latency. Pursuant to most read commands issued from a host computer, a transducer reads data stored on multiple tracks of a disc. The transducer executes the read command by reading a target area on each of the multiple tracks. A target area is a group of data sectors on each track that stores a data segment requested by the read command.

As the transducer arrives on a track to access the first sector of the target area, the transducer may actually land on the track at a location subsequent in sequential order to the first sector. Under such circumstances, the disc drive waits for the first sector to revolve under the transducer as the disc is rotating at a predetermined speed. Once the first sector arrives under the transducer, the data stored on the target area is transferred to the buffer for subsequent transfer to the host computer. Read latency is thus highly affected by the speed at which the disc is rotated and the landing distance of the transducer from the first sector. Indeed, if the transducer lands at the sector adjacent and subsequent to the first sector, the disc drive must wait one complete revolution prior to reading data, thereby maximizing read latency in the drive. A dramatic and constant increase in the bits per inch (BPI) and the tracks per inch (TPI) of disc surfaces further complicates disc drive designers' attempts to minimize read latency.

SUMMARY OF THE INVENTION

Against this backdrop the present invention has been developed. The present invention is a process for reading data stored on a track of a rotating data storage disc upon arrival of a transducer to any sector on the track. A read command is issued by a host computer that requests retrieval of a particular data segment. The data segment is divided into a plurality of data blocks. The read command specifies a target sector storing the first data block of the data segment. In response to the command, a transducer is moved across the disc to the track and lands on a data sector. If the transducer lands on a data sector having a sequential address after the target sector, the process of the present invention reads data stored on the disc beginning with the landing sector and ending with a predetermined end sector. In accordance with one embodiment, the data sectors read from the landing sector to the end sector store a portion of the data segment requested by the read command as well as a portion of post-fetch data. In accordance with a second embodiment, the data sectors read from the landing sector to the end sector do not store a portion of the data segment requested by the read command, but rather store post-fetch data.

In accordance with an embodiment, the process of the present invention does not read data stored on sectors accessed by the transducer after the data block stored on the end sector is read until a predetermined index sector is rotated under the transducer. Starting with the predetermined index sector, the process reads the data block stored on each sector accessed by the transducer until the transducer accesses the data sector immediately preceding the landing sector. Thus, the data block stored on the target sector is read during this interim. In accordance with one embodiment, the predetermined index sector has a sequential address before the target sector and the data sectors read between the predetermined index sector and the target sector store pre-fetch data. In accordance with a second embodiment, the predetermined index sector is the target sector.

Embodiments of the invention may be implemented either manually or as a computer-readable program storage device which tangibly embodies a program of instructions executable by a computer system to transfer data from a track on a rotating disc to a buffer as a transducer lands on the track at a location subsequent to the target sector with respect to sequential ordering of the data sectors on the track.

These and various other features as well as advantages, which characterize the present invention, will be apparent from a reading of the following detailed description and a review of the associated drawings.

DETAILED DESCRIPTION

Figure 1:
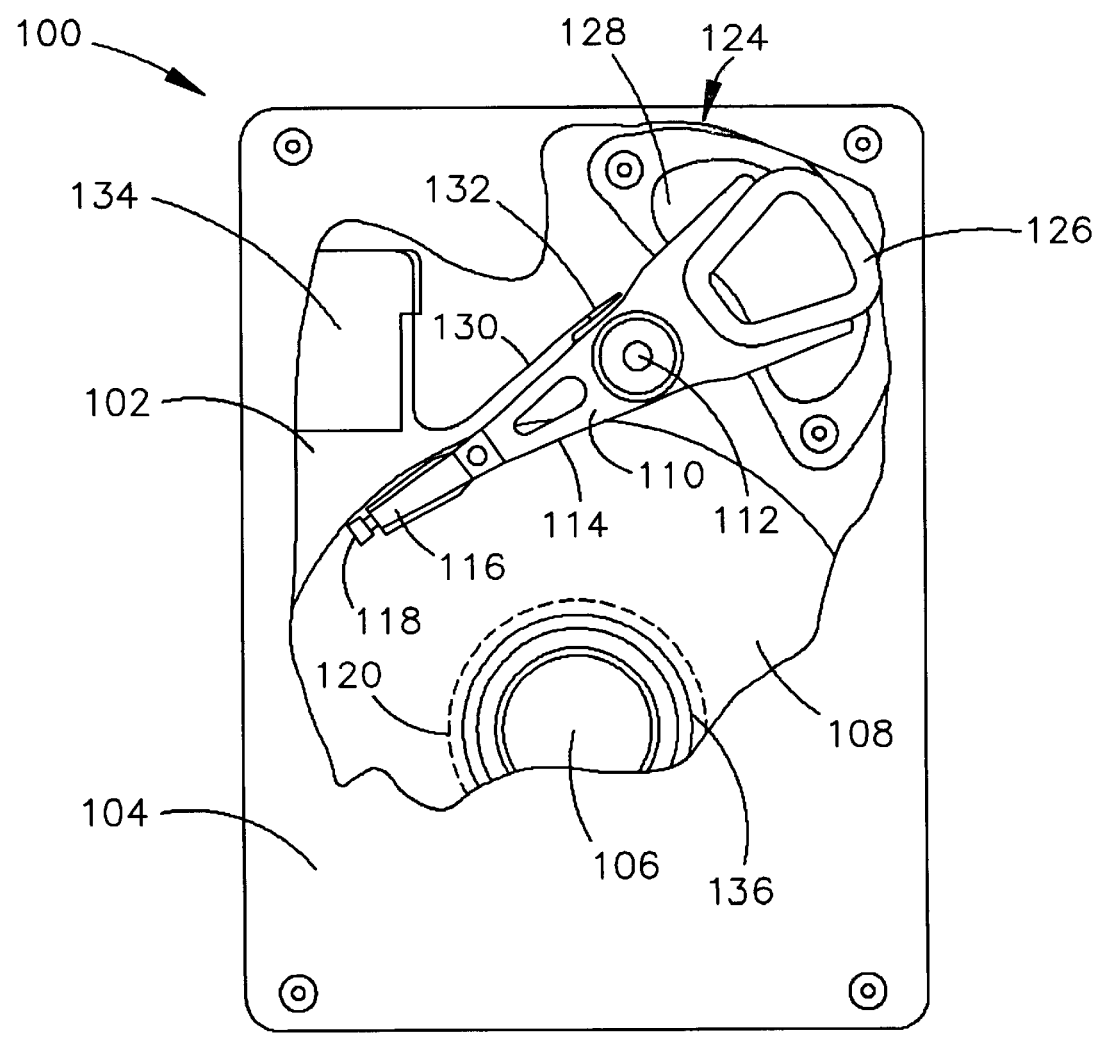
FIG. 1 is a plan view of a disc drive incorporating an embodiment of the present invention showing the primary internal components.

The present invention and its various embodiments are described in detail below with reference to the figures. When referring to the figures, like structures and elements shown throughout are indicated with like reference numerals.

A disc drive 100 constructed in accordance with an embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more discs 108 at a constant high speed. Information is written to and read from tracks 306 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer 118 that includes an air bearing slider enabling the transducer 118 to fly in close proximity above the corresponding surface of the associated disc 108. The transducers 118 are commonly referred to as read/write heads because each transducer 118 includes a write element (not shown) for writing data to a disc 108 and a read element (not shown) for reading data previously written to the disc 108.

The spindle motor 116 is typically de-energized when the disc drive 100 is not in use for extended periods of time. The transducers 118 are moved over park zones 120 near the inner diameter of the discs 108 when the drive motor is de-energized. The transducers 118 are secured over the park zones 120 through the use of an actuator latch arrangement, which prevents inadvertent rotation of the actuator assembly 110 when the transducers 118 are parked.

The radial position of the transducers 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the transducers 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the transducers 118. The printed circuit board 132 typically includes circuitry for controlling the write currents applied to the transducers 118 during a write operation and for amplifying read signals generated by the transducers 118 during a read operation. The flex assembly 130 terminates at a flex bracket 134 for communication through the base deck 102 to a disc drive printed circuit board (not shown) mounted to the bottom side of the disc drive 100.

Figure 2:
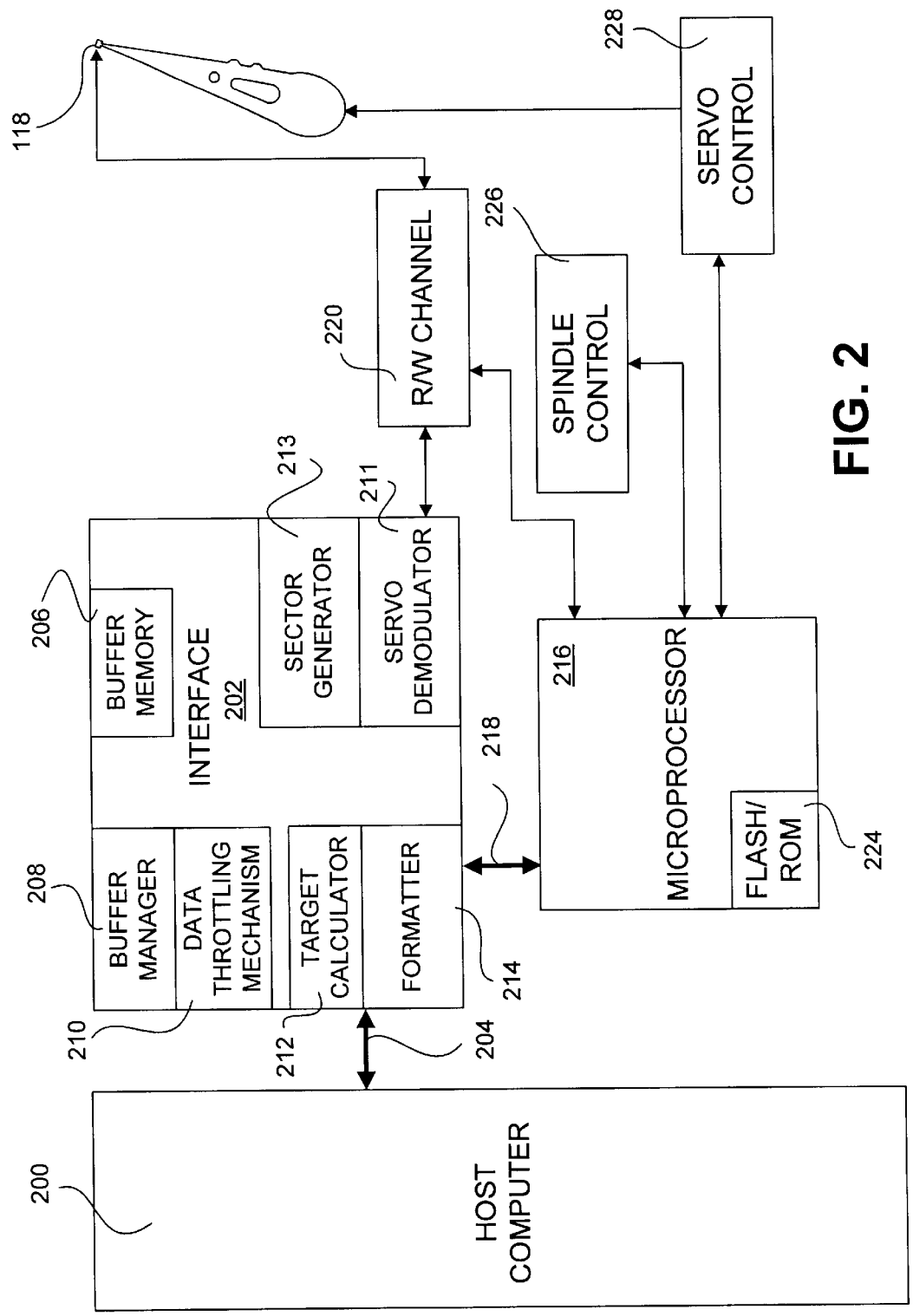
FIG. 2 is a functional block diagram generally showing the main functional components used to control the disc drive of FIG. 1 including an interface having a data throttling mechanism and a buffer manager in accordance with an embodiment of the present invention.
Figure 3:
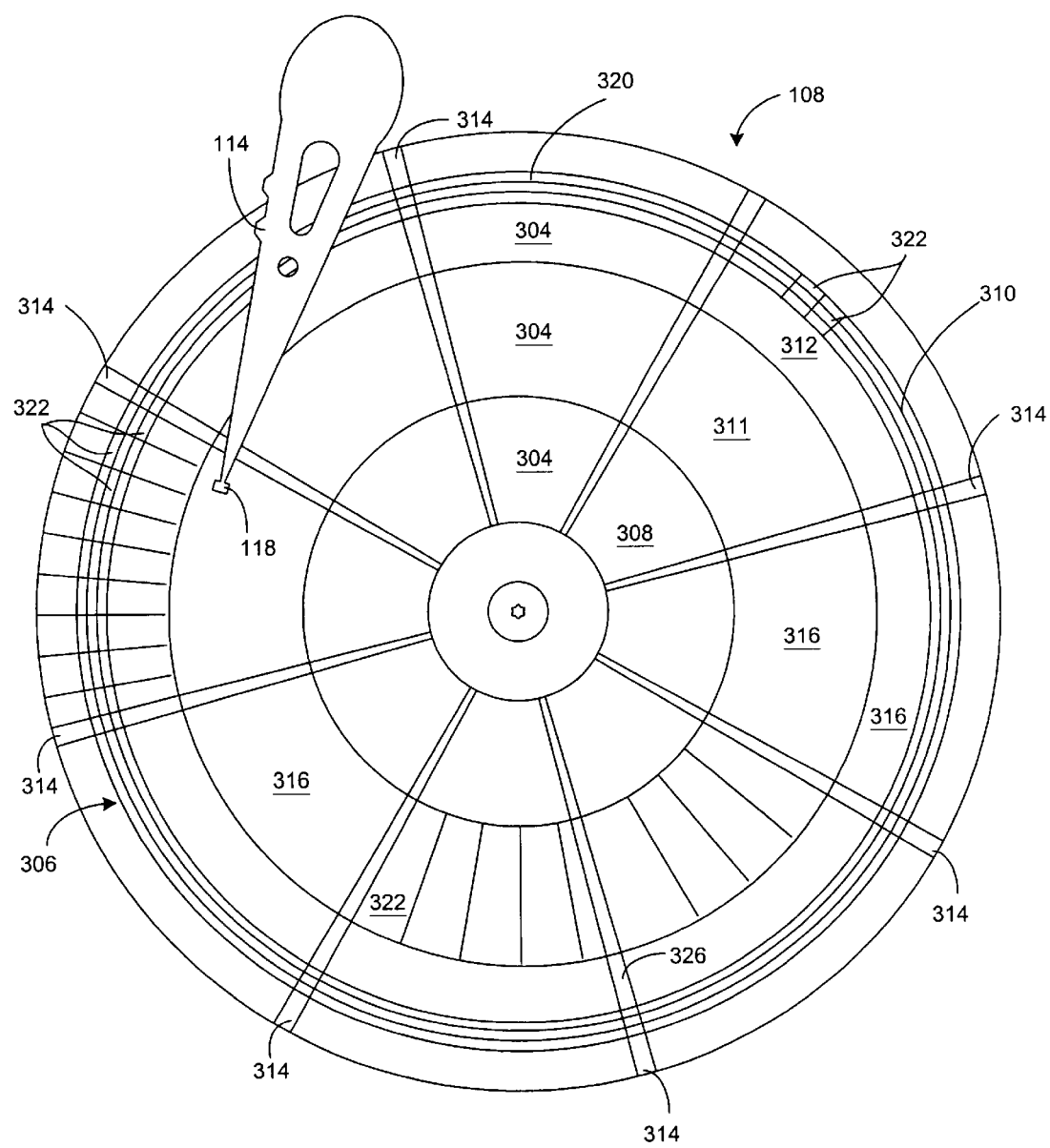
FIG. 3 is a plan view of a disc of the disc drive of FIG. 1 generally showing the main components on the surface of the disc.

FIG. 2 shows a functional block diagram of the disc drive 100 of FIG. 1, generally showing the main functional circuits which are preferably resident on a disc drive printed circuit board 132 and which are used to control operation of the disc drive 100. FIG. 3 shows the logical recording structure of an exemplary disc 108 of the disc drive 100. FIGS. 2 and 3 are described below in tandem due to the inter-relationship between the illustrations shown in these figures.

The host computer 200 is operably connected to an interface application specific integrated circuit ("interface") 202 via various control and data lines 204. The interface 202 includes an associated buffer memory 206 which facilitates high-speed data transfer between the host computer 200 and the disc drive 100. Additionally, the interface 202 includes a buffer manager 208, a data throttling mechanism 210, a servo demodulator 211, a sector generator 213, a target calculator 212, and a formatter 214, which together, facilitate the orderly flow of data to and from the disc drive 100. It should be understood that any or all of the buffer memory 206, the buffer manager 208, the data throttling mechanism 210, the servo demodulator 211, the sector generator 213, the target calculator 212, and/or the formatter 214, may be located outside of the interface 202. Various configurations of these elements within the disc drive 100 may be employed without departing from the scope of the invention.

A microprocessor 216 is operably connected to the interface 202 via various control and data lines. The microprocessor 216 provides top level communication and control for the disc drive 100 in conjunction with programming for the microprocessor 216. The programming is typically stored in a microprocessor memory (MEM) 224. The MEM 224 may include random access memory (RAM), read only memory (ROM) and other sources of resident memory for the microprocessor 216. Additionally, the microprocessor 216 provides control signals for a spindle control module 226 and a servo control module 228. The spindle control module 226 is responsible for spinning the discs 108 at a speed (rpm) set by the microprocessor 216. The servo control module 228 controls movement of the activator arms 114 relative to the discs 108 based on commands issued by the microprocessor 216 and positioning signals fed back to the module 228 from the transducers 118.

Referring now to FIG. 3, the disc 108 is divided into several concentric disc zones 304 which contain regions of adjacent tracks 306. For example, the magnetic disc 108 of FIG. 3 includes an inner zone 308, a center zone 311, and an outer zone 312. When configured with servo burst sectors 314, each disc track 306 is divided into slices called data wedges 316. The servo burst sectors 314 include data for maintaining accurate positioning of the transducer 118 and are positioned in predetermined locations along the disc 108. As the disc 108 rotates, the transducer 118 reads the servo information containing an address within the servo bursts 314 and sends the servo information back to the servo control module 228. The servo control module 228 checks whether the address in the servo information read from the burst sectors 314 corresponds to the desired head location. If the address does not correspond to the desired head location, the actuator arm 114 is adjusted until the head 118 is moved to the correct track location.

Each track 306 includes discrete data sectors 322 containing stored user information. Each data sector 322 stores a single block of data. The number of data sectors 322 contained in a particular track 306 depends, in part, on the length (i.e. circumference) of the track 306. Therefore, tracks 306 located at the outer zone 312 typically contain more data sectors 322 per data wedge 316 than tracks 306 located at the center zone 311. Similarly, tracks 306 located at the center zone 311 typically contain more data sectors 322 per data wedge 316 than tracks 306 located at the inner zone 308. Besides containing user information, each data sector 322 may also include other data to help identify and process the information. As noted above, tracks 306 may also contain one or more permanently defective sectors 322 that cannot be reliably written to or read from by the disc drive 100 circuitry. For this reason, a number of alternate sectors are provided in one or more alternate tracks 320 to which data that is intended to be written in these defective sectors can be revectored.

Referring back to FIG. 2, data to be written to the disc drive 100 are passed from the host computer 200 to the buffer 206 and then on to a read/write channel 220, which encodes and serializes the data and provides the requisite write current signals to the transducers 118 such that the data is written to the appropriate sectors 322 of the disc 108. To retrieve data that has been previously stored in the sectors 322 on the disc 108, the transducers 118 are passed over the disc sectors 322 and read signals are generated by the read elements of the transducers 118. The read signals are provided to the read/write channel 220. The interface 202 performs read signal decoding, error detection, and error correction operations. The interface 202 then outputs the retrieved data to the buffer 206 for subsequent transfer to the host computer 200.

The buffer 206 includes a number of individual buffer sectors (not shown) into which data from the discs 108 and/or the host computer 200 are temporarily stored while awaiting transfer to or from the discs 108 or the host computer 200. In general, the buffer manager 208 controls or manages the flow of data into and out of the buffer memory 206. Each of the buffer sectors in the buffer 206 has a unique address within the buffer 206 which may be used by the buffer manager 208 for directing the transfer of data to and from the buffer sectors. In accordance with an embodiment, the data are stored in the buffer 206 in consecutive buffer sector addresses. Also, in this embodiment, data stored in the buffer 206 are stored in the buffer sectors in the same sequential order as that data was stored on the disc 108 or in the host 200.

The disc drive 100 includes a data throttling mechanism 210. The data throttling mechanism 210 is employed in the disc drive 100 to prevent over-run and under-run conditions in the buffer 206. For example, when data is read from the disc 108 to the host 200, the data throttling mechanism 210 keeps track of the number of buffer sectors to which data blocks from the disc 108 are written. As the data blocks are being written to the buffer 206 from the disc 108, data within the buffer 206 is virtually simultaneously being extracted from the buffer 206 for delivery to the host computer 200. To keep track of the incoming and outgoing data, so as to prevent over-run and under-run conditions in the buffer 206, the data throttling mechanism 210 employs, among other things, a host counter (such as 504 in FIG. 5) and a disc counter (such as 500 in FIG. 5). As each new block of data is being transferred to the host 200 from the buffer 206, the host counter is updated. Similarly, as each block of data is written to the buffer 206 from the disc 108, the disc counter is updated. Based on these counters, among other things, the data throttling mechanism 210 either stops the flow of data into the buffer 206 or the flow of data out of the buffer 206 so that buffer over-run and/or buffer under-run conditions do not occur. Operation of the data throttling mechanism 210, as well as various component parts of the mechanism 210, are described in more detail below with reference to FIG. 5.

As shown in the embodiment illustrated in FIG. 2, the interface 202 also includes a formatter 214, which is commonly referred to as a "disc sequencer." The formatter 214 keeps track of the location on the disc 108 of the servo burst sectors 314 and the data sectors 322. The formatter 214 is located along a communications path between the buffer 206 and the disc 108. The formatter 214 regulates the flow of data between the buffer 206 and the disc 108 such that the data being sent to the disc 108 from the buffer 206 are properly written to the appropriate sectors 322 on the disc 108 and so that servo burst sectors 314 are not mistakenly written to. The formatter 214 also regulates the flow of data being transferred from the disc 108 to the buffer 206 such that the appropriate sectors 322 are read from the disc 108, and thus, the data requested by the host computer 200 is sent to the buffer 206. Disc drive formatters of the type described are well known to those skilled in the art and, therefore, a detailed description of the formatter 214 is not provided here.

The servo demodulator 211 is operably connected to the read/write channel 220. The servo demodulator 211 interprets signals from the read/write channel 220 and sends a modified signal to the sector generator 213. The sector generator 213 utilizes the accurate timing by the servo demodulator 211 to generate sector pulses representing the beginning of each data sector 322 on the disc 108. Specifically, the sector generator 213 calculates where all data sectors 322 start on the disc 108 and creates sector pulses associated with those locations. This information is transferred to the target calculator 212. The target calculator 212 selects which sector pulses to pass on to the formatter 214, thereby informing the formatter 214 when the head 118 is over the desired data sector 322 for access. The formatter 214 uses this pulse to access the disc 108 through the read/write channel 220.

Figure 11:
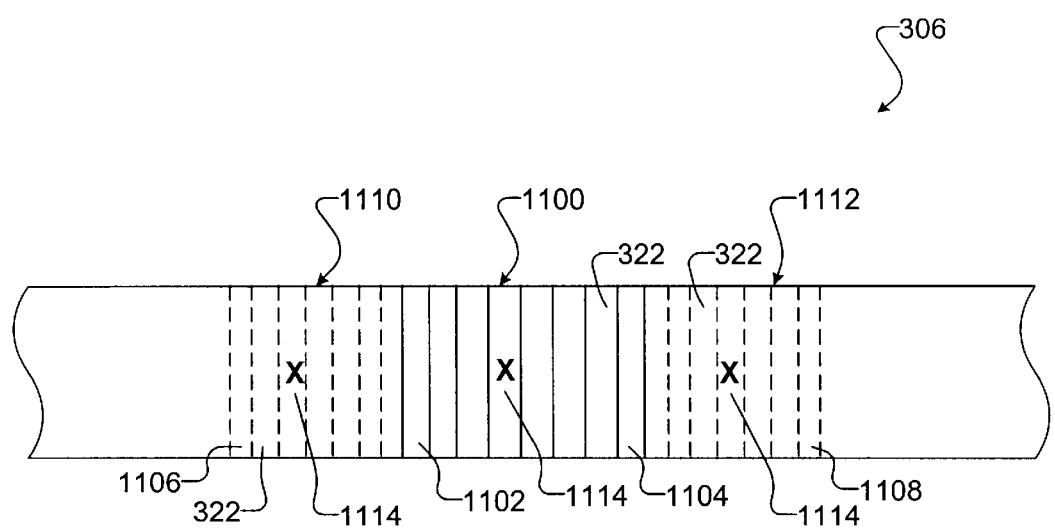
FIG. 11 is an illustration of an exemplary data arrangement on a track of the disc of FIG. 3.

FIG. 11 is an exemplary section of a track 306 of a data storage disc 108 on which data may be stored and thereafter read by a transducer 118 for transfer to a host computer via a buffer 206. The track 306, and portions and sectors 322 thereof, are shown in FIG. 11 and used throughout this Detailed Description to illustrate embodiments of the present invention, and thus should not be construed to limit the scope of the invention recited in the claims. The track 306 shown in FIG. 11 includes a group 1100 of data sectors 322 that together store adjacent blocks of data making up a data segment. Read commands issued by a host computer 200 may, and typically do, request retrieval of a file made up of one or more data segments. Each data segment in the file to be read is referred to as a "target area," which is shown in FIG. 11 as solid lines referenced by reference numeral 1100.

The data sector 322 storing the first block of the data segment is referred to as the "target sector." The target sector is shown in FIG. 11 using reference numeral 1102. The data sector storing the final block of the data segment is referred to as the "end sector" of the target area 1100. The target area end sector is shown in FIG. 11 using the reference numeral 1104. Thus, the target area 1100 is bounded by the target sector 1102 and the target area end sector 1104.

In accordance with an embodiment, the read command specifies a predetermined number of data sectors 322 preceding the target area 1100 as pre-fetch data recommended for retrieval with the data segment. The portion of the track 306 containing these predetermined number of pre-fetch data sectors 322 is generally referred to as a pre-fetch data portion 1110. The data sector 322 storing the initial pre-fetch data block is referred to as a pre-fetch target sector 1106. The pre-fetch target sector 1106 can be determined by subtracting the number of recommended pre-fetch data blocks from the sequential order number of the target sector 1102. A sequential order number, also referred to as a physical block address (PBA), is defined as the sector number starting from the reference zero and going either clock-wise or counter-clockwise around the track 306, wherein each adjacent sector 322 is ordered in sequential fashion to, i.e., either one count greater than or one count less than, the other.

The read command may specify a predetermined number of data sectors subsequent to the target area 1100 as post-fetch, or "look-ahead," data recommended for retrieval with the data segment. The portion of the track 306 containing these predetermined number of post-fetch data sectors 322 is generally referred to as a post-fetch data portion 1112. The data sector 322 storing the final post-fetch data block is referred to as a post-fetch end sector 1108. The post-fetch end sector 1108 can be determined by adding the predetermined number of post-fetch data blocks to the sequential order number of the data segment end sector 1104.

As the first data segment of a file is being read from the disc 108 pursuant to a read command, it is preferable to read not only the data segment, but also the predetermined amount of pre-fetch and post-fetch data. This is particularly true with disc drives 100 operating in distributed computing environments wherein multiple software applications run simultaneously.

In response to a read command, a transducer 118 is moved across a disc 108 to the track 306 having the target area 1100 storing the first data segment to be read pursuant to the command. In accordance with an embodiment of the present invention, data is immediately read upon arrival of the transducer 118 to a location on the track 306. As such, the transfer of data is not precluded until the target sector 1102 revolves below the read element as in conventional processes, but rather begins with the data block stored on the first sector accessed upon arrival of the transducer 118 to the track 306. This first sector accessed is referred to as a landing sector 1114. The landing sector 1114 may be any sector 322 on the track 306, including the target sector 1102. Several exemplary positions for the landing sector 1114 are shown in FIG. 11. A first position is located prior to the target sector 1102 within the pre-fetch data portion 1110; a second position is located within the target area 1100 following the target sector 1102; and a third position is located following the target area end sector 1104 within the post-fetch data portion 1112.

Figure 4:
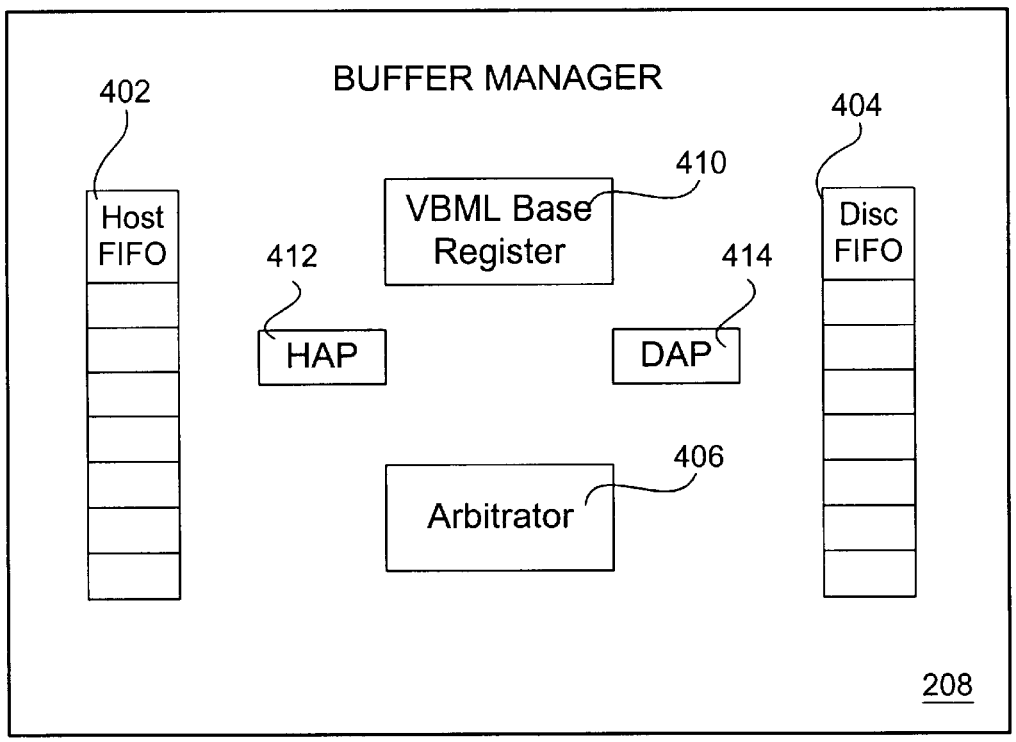
FIG. 4 illustrates various component parts of the buffer manager shown in FIG. 2.
Figure 4:
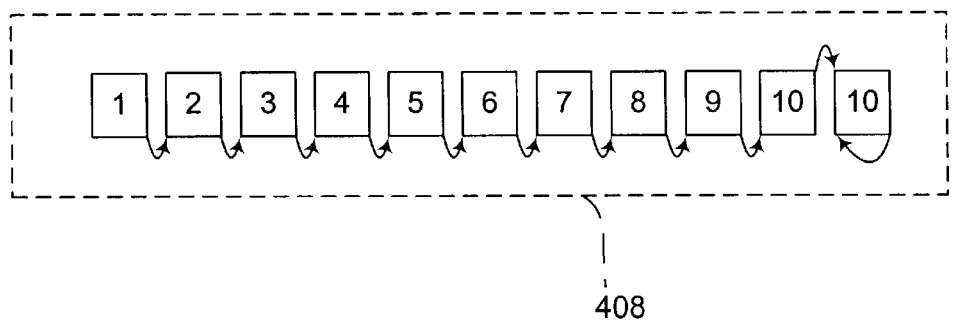

Referring now to FIG. 4, various components of the buffer manager 208 of FIG. 2 are shown in accordance with an embodiment of the present invention. The buffer manager 208 includes, among other things, a host first-in-first-out queue (FIFO) 402 for temporarily storing data transferred between the host computer 200 and the buffer 206, a disc FIFO 404 for temporarily storing data transferred between the disc 108 and the buffer 206, and an arbitrator 406 for controlling the transfer of data into and through the FIFOs to the buffer 206. Additionally, the buffer manager 208 includes a VBML base register 410, a disc address pointer register (DAP) 414, and a host address pointer register (HAP) 412. The buffer manager 208 also maintains a vector buffer manager list (VBML) 408, as described in more detail below.

The DAP 414 and the HAP 412 are used by the buffer manager 208 to indicate where in the buffer 206 a data block is to be placed during a read or write operation. The HAP 412 indicates or points to the buffer sector where a data block incoming from the host computer 200 is to be placed, or conversely, the buffer sector from which a data block outgoing to the host computer 200 is to be extracted. Similarly, the DAP 414 indicates or points to the buffer sector where a data block incoming from the disc 108 is to be placed, or conversely, the buffer sector where a data block outgoing to the disc 108 is to be extracted.

For example, when the host computer 200 requests a transfer of data from the disc 108 to the host 200 via the buffer 206, i.e., a read request, the HAP 412 and DAP 414 will initially point to the same buffer sector. As data are coming into the buffer 206 from the disc 108, the next buffer sector to be written with a data block from the disc 108 will be indicated by the VBML 408. As data blocks are being written from the disc 108 to the buffer 206 at each individual buffer sector, the HAP 412 will continue to point to the first buffer sector written during the transmission from the disc 108 to the buffer 206. After the write has been completed and all of the intended data has been written to the appropriate buffer sectors, the DAP 414 will be pointing to the last buffer sector written during the read request and the HAP 412 will be pointing to the first buffer sector written during the read request. When the data written to the buffer 206 from the disc 108 during the read request are consequently transferred from the buffer 206 to the host 200, the HAP 412 will then indicate the first buffer sector containing data to be transferred to the host 200. As with the initial write of the data to the buffer 206 from the disc 108, the next buffer sector containing a data block to be transferred to the host 200 will be indicated by the VBML 408. Buffer sectors will continue to be read, under the direction of the VBML 408, until all of the intended data has been transferred from the buffer 206 to the host 200.

The VBML 408 includes a singly-linked list of next buffer sector locations in accordance with an embodiment of the present invention. That is, the VBML 408 indicates the order and location of buffer sectors to be accessed during an access request. A new VBML 408 is typically, but not always, constructed for each new access request. The VBML base register 410 contains a pointer indicating the address of the first buffer sector in the user data region of the buffer 206. In accordance with an embodiment, the VBML base register 410 is set once at power up of the disc drive 100. The locations expressed in the VBML 408 are then determined and indicated relative to the VBML base register 410. The length of the VMBL 408 is variable and dependent on the length of the data segment and appropriate pre- and post-fetch data, if any, being transferred in a given read or write request as well as the size of the buffer 206. Through manipulation of the VBML 408, the order in which buffer sectors in the buffer 206 are written to and read from can be controlled.

Figure 5:
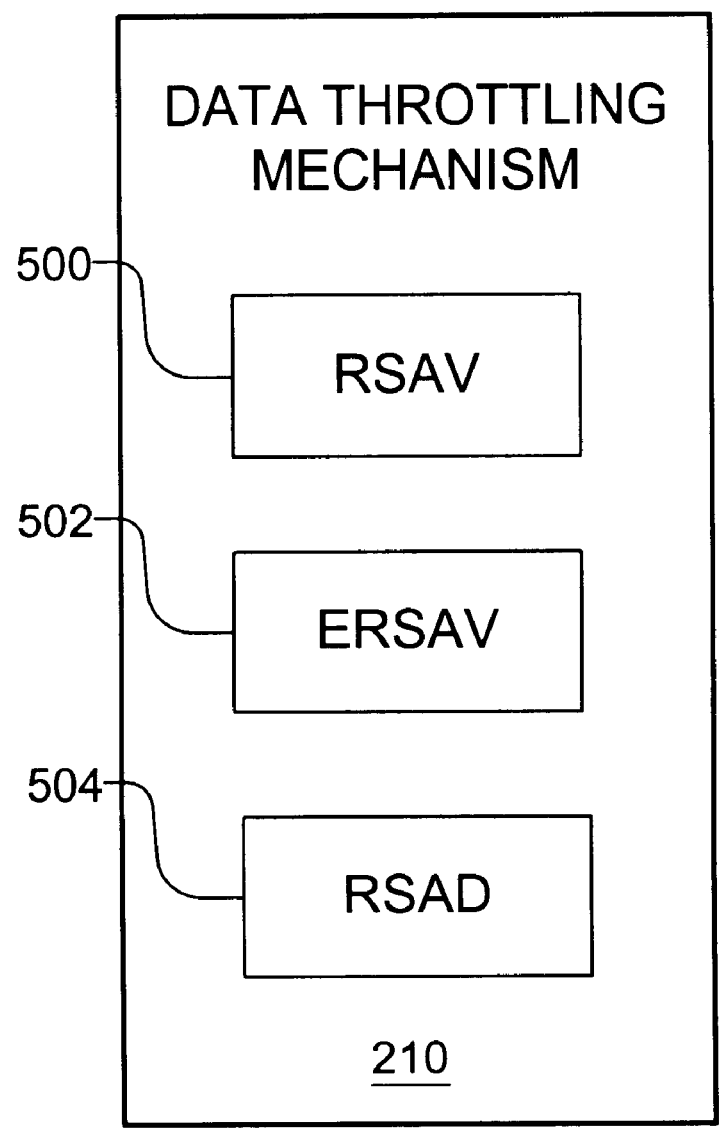
FIG. 5 illustrates various component parts of the data throttling mechanism shown in FIG. 2.

Referring now to FIG. 5, various components of the data throttling mechanism 210 of FIG. 2 are shown in accordance with an embodiment of the present invention. The data throttling mechanism 210 includes, among other things, as read sectors available (RSAV) register 500, an extra read sectors available (ERSAV) register 502 and a read sectors adjust (RSAD) register 504. The RSAV register 500, which counts the number of data blocks read from the disc 108 into the buffer 206, may also be referred to as a disc counter. The RSAV register 500 counts the number of data blocks read on the disc 108 in order to regulate and monitor the transfer of data from the disc drive 100 to the buffer 206. The count of the RSAV register 500 thus indicates how many buffer sectors contain a data block that may be available to the host computer 200. The count of the RSAV register 500 is incremented by one as each data block is read from a data sector 322 on the disc 108 and written to a corresponding buffer sector. The RSAD register 504, also referred to as a host counter, counts the number of data blocks that are transferred from the buffer 206 to the host computer 200. The RSAD register 504 also allows for an offset to the first buffer sector that will store a data block that, once written to the buffer sector, is to be transferred to the host computer 200.

A group of data blocks that are adjacent to one another on a track 306 make up a data segment. Read commands issued by the host computer 200 typically request retrieval of a file stored as multiple data segments on one or more discs 108 of the disc drive 100. The read command requests retrieval of each data segment in a specified sequential order. These multiple data segments are typically contained on multiple tracks 322 of the disc 108.

Immediately after the host computer 200 issues a read command, the servo control module 228 is called upon to move the actuator assembly 110 such that the transducer 118 affixed to the end of the appropriate actuator arm 114 is positioned on the track 306 that contains the first data segment to be retrieved in the file. The read element of the transducer 118 accesses the first data sector 322, i.e., landing sector 1114, that is directly under the read element in a manner substantially immediately to the arrival of the transducer 118 on this track 306.

The landing sector 1114 may be located either before or after the target sector 1102 with respect to the sequential ordering of sectors 322 on the track 306. Whether the landing sector 1114 is located before or after the target sector 1102 depends on the direction of rotation of the disc 108 as well as whether the transducer 118 is accessing the top medium of the disc 108 or the lower medium of the disc 108. In accordance with an embodiment, each data sector 322 of each track 306 on a disc 108 is numbered in sequential order starting with zero. The end of the track 306 is thus a data sector 322 adjacent to and three-hundred sixty degrees from sector zero. As an illustration of the orientation of a landing sector 1114 to a target sector 1102, if the target sector 1102 is sector thirty-five and the landing sector 1114 is sector one-hundred, then the landing sector 1114 is said to follow, i.e., be located after, the target sector 1102. In this respect, the sequential order of the landing sector 1114 is deemed greater than the sequential order of the target sector 1102. Operation of the various registers of the data throttling mechanism 210 are described below with such an orientation in mind.

In accordance with an embodiment of the present invention, the registers of the data throttling mechanism 210 are used to implement a read-on-arrival scheme for reading a requested data segment as well as pre- and post-fetch data adjacent to the data segment immediately upon arrival of the transducer 118 to the track 306 storing the data segment. The data segment and adjacent pre-fetch and post-fetch data to be transferred from a particular track 306 to the buffer 206 is collectively referred to as a buffer segment. This read-on-arrival scheme is briefly described with reference to FIG. 5 and more particularly described with reference to FIGS. 7, 8 and 9.

If the transducer 118 lands before or on the target sector 1102, data is immediately transferred between the disc 108 and the corresponding buffer sectors in the buffer 206. More particularly, the formatter 214 enables the transfer of a data block from each respective disc sector 322 to a corresponding buffer sector starting with the landing sector 1114. The formatter 214 continues enabling the transfer of data between the disc 108 and the buffer 206 until the data block stored on the end sector 1108 of the post-fetch portion 1112 is read from the disc 108. The operation of the formatter 214, however, may be halted if the capacity in the buffer 206 is filled prior to each data block in the data segment having been read from the disc 108 into the buffer 206. As described in the following paragraph, the RSAV register 500 indicates when this situation may occur.

As each block of data is read from a data sector 322 and written to a corresponding buffer sector of the buffer 206, the count of the RSAV register 500 is incremented by one. The RSAV register 500 controls whether the formatter 214 allows the transfer of data to the buffer 206 as the disc 108 spins under the read element of the transducer 118. The formatter 214 remains open, thereby enabling the transfer of data to continue, so long as the count of the RSAV register 500 does not reach the count of the buffer segment size.

Still referring to circumstances wherein the transducer 118 lands before or on the target sector 1102, the RSAD register 504 is set to a count equal to the number of data sectors 322 between the landing sector 1114 and the target sector 1102. The RSAV register 500 works with the RSAD register 504 to regulate the transfer of data from the buffer 206 to the host computer 200. More particularly, the transfer of data from the buffer 206 to the host computer 200 is enabled if the count of the RSAV register 500 is greater than the count of the RSAD register 504. Otherwise, if the count of the RSAV register 500 is less than or equal to the count of the RSAD register 504, data is not sent from the buffer 206 to the host computer 200, but rather remains in the buffer 206. The count of the RSAV register 500 exceeds the count of the RSAD register 504 immediately after the data block stored in the target sector 1102 is read from the disc 108 and written to a buffer sector because (1) the count of the RSAV register 500 is incremented by one with each block of data read from the disc 108 and written to the buffer 206; and (2) the RSAD register 504 is set to a count equal to the number of data sectors 322 between the landing sector 1114 and the target sector 1102.

The host address pointer (HAP) 412, which dictates the buffer sector from which data is extracted, is set at the beginning of the read-on-arrival scheme to the buffer sector corresponding to the target sector 1102. Therefore, as the count of the RSAV register 500 exceeds the count of the RSAD register 504, the first data block provided to the host computer 200 is the data block that was stored on the target sector 1102. The HAP 412 is then advanced to the next buffer sector as described with FIG. 4. The count of the RSAD register 504 is incremented by one with each data block transferred from the buffer 206 to the host computer 200. For this reason, the count of the RSAD register 504 trails the RSAV register 502 by a count of one as the remainder of the data segment and the post-fetch data of the buffer segment is being read from the disc 108 into the buffer 206. This enables the host computer 200 to retrieve the entire data segment from the buffer 206 in the specified sequential order.

If the transducer 118 lands after the target sector 1102, the ERSAV register 502 of the data throttling mechanism 210 is used to implement the read-on-arrival scheme described above. As with the situation wherein the landing sector 1114 is located before the target sector 1102, data is immediately transferred between the disc 108 and the corresponding buffer sectors in the buffer 206 if the landing sector 1114 is located after the target sector 1102. The formatter 214 thus enables the transfer of a data block from each respective data sector 322 to a corresponding buffer sector starting with the landing sector 1114, regardless of whether the transducer 118 lands before, on or after the target sector 1102. However, the formatter 214 does not continuously enable the transfer of data between the disc 108 and the buffer 206 over the entire track 306. The formatter 214 only enables the transfer of data blocks contained in the buffer segment, i.e., data blocks of the data segment as well as data contained within the adjacent pre- and post-fetch data portions (1110 and 1112).

Operation of the formatter 214 may also be halted if the capacity in the buffer 206 is filled prior to each data block in the data segment having been read from the disc 108 into the buffer 206. The combined count of the ERSAV register 502 and the RSAV register 500 controls whether the formatter 214 allows the transfer of data to the buffer 206 as the disc 108 spins under the read element of the transducer 118. The formatter 214 remains open, thereby enabling the transfer of data to continue so long as (1) the count of the RSAV register 500 and the ERSAV register 502 do not combine to reach the count of the buffer segment size; or, as noted above, (2) the transducer 118 is not currently located on the track 118 between the end sector 1108 of the post-fetch data portion 1112 and the pre-fetch target sector 1106.

Beginning with the landing sector 1114 and continuing to the end sector 1108 of the post-fetch data portion 1112, the count of the ERSAV register 502 is incremented by one as each block of data is read from a data sector 322 into the buffer 206. The count of the RSAV register 500 remains zero during this time. The end sector 1108 of the post-fetch data portion 1112 is determined based on parameters specified in the read command issued by the host computer 200. For example, if the buffer segment size is 50 data blocks; the pre-fetch data portion 1110 is 20 sectors; the actual data segment is 20 data blocks; and the target sector 1102 is sector twenty, then the end sector 1108 of the post-fetch data portion 1112 is sector fifty. In this example, there are 10 sectors of post-fetch data. The formatter 214 closes, thereby precluding the transfer of data from the disc 108 to the buffer 206 as the read element arrives to the end sector 1108 of the post-fetch data portion 1112.

The formatter 214 re-enables the transfer of data once the transducer 118 accesses the pre-fetch target sector 1106. Starting with the pre-fetch target sector 1106, the count of the RSAV register 500 is incremented with each data block read from the disc 108 into the buffer 206. As with circumstances wherein the landing sector 1114 is located before the target sector 1102, the RSAD register 504 is set to a count equal to the number of pre-fetch data sectors included within the recommended pre-fetch data portion 1110 if the landing sector 1114 is located after the target sector 1102. In accordance with an embodiment, this quantity is the number of adjacent data sectors 322 between sector zero and the target sector 1102. For example, if the target sector 1102 is set to sector thirty, there are thirty sectors 322 that store pre-fetch data that are to be read into the buffer 206 with the data segment. Thus, the count of the RSAD register 504 would be set to thirty.

The RSAV register 500 works with the RSAD register 504 to regulate the transfer of data from the buffer 206 to the host computer 200 if the transducer 118 lands after the target sector 1102. More particularly, the transfer of data from the buffer 206 to the host computer 200 is enabled if the count of the RSAV register 500 is greater than the count of the RSAD register 504. Otherwise, if the count of the RSAV register 500 is less than or equal to the count of the RSAD register 504, data is not sent from the buffer 206 to the host computer 200, but rather remains in the buffer 206. The count of the RSAV register 500 exceeds the count of the RSAD register 504 immediately after the data block stored in the target sector 1102 is read from the disc 108 and written to a buffer sector because (1) the count of the RSAV register 500 is incremented by one with each block of data read from the disc 108 and written to the buffer 206; and (2) the RSAD register 504 is set to a count equal to the number of pre-fetch data sectors 322 specified by the read command.

The host address pointer (HAP) 412, which dictates the buffer sector from which data is extracted, is set at the beginning of the read-on-arrival scheme to the buffer sector corresponding to the target sector 1102. Therefore, as the count of the RSAV register 500 exceeds the count of the RSAD register 504, the first data block provided to the host computer 200 is the data block that was stored on the target sector 1102. The HAP 412 is then advanced to the next buffer sector as described with FIG. 4.

The count of the RSAD register 504 is incremented by one with each data block transferred from the buffer 206 to the host computer 200. For this reason, the count of the RSAD register 504 trails the RSAV register 502 by a count of one as the remainder of the data segment is being read from the disc 108 into the buffer 206. The formatter 214 disables the flow of data from the disc 108 to the buffer 206 once the read element of the transducer 118 arrives at the landing sector 1114. Therefore, the count of the RSAV register 500 is no longer incremented because the flow of data from the disc 108 to the buffer 206 has been halted. However, the count of the ERSAV register 502 is added to the current count of the RSAV register 500. As such, the RSAV register 500 is forced greater than the RSAD register 504 for the remaining buffer sectors storing the data segment and these buffer sectors are immediately made available to the host computer 200. This enables the host computer 200 to retrieve the entire data segment from the buffer 206 in the specified sequential order.

Embodiments of the present invention may be implemented either manually or as a computer-readable program storage device which tangibly embodies a program of instructions executable by a computer system for transferring data from a disc 108 to a buffer 206 as a transducer 118 initially accesses a track 306 on the disc 108 at a sector 322 subsequent in sequential order to the target sector 1102. As such, the logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 6:
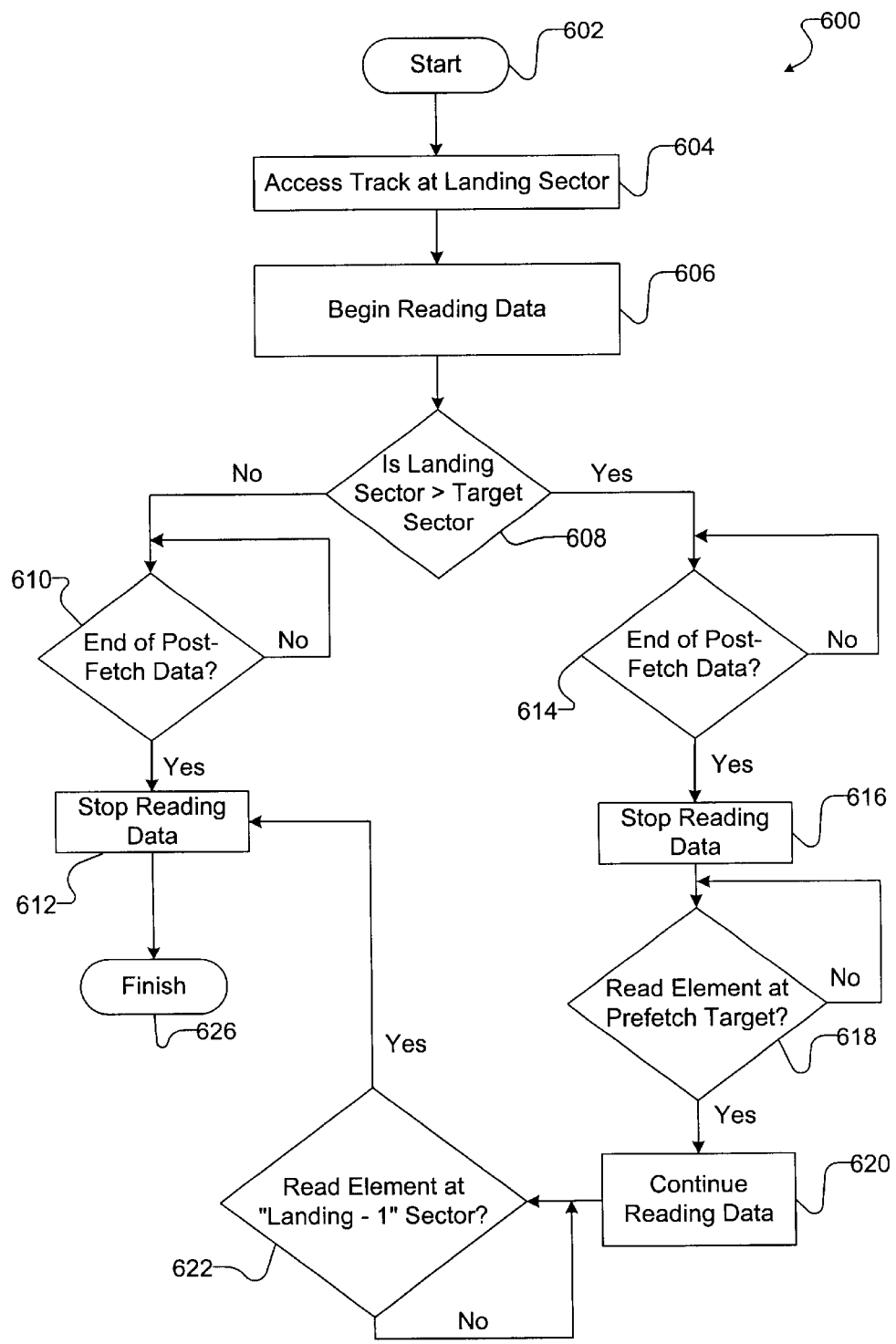
FIG. 6 is a flow diagram that illustrates operations for a process of reading data stored on a track of a data storage disc on arrival of a transducer to the track in accordance with an embodiment of the present invention.

FIG. 6 illustrates operations of a read-on-arrival process 600 for reading a data segment stored on a disc 108 in accordance with an embodiment of the present invention. The read-on-arrival process 600 may be implemented either in disc drive firmware or using the various hardware components of the interface 202, or a combination of both. The read-on-arrival process 600 comprises an operation flow beginning with a start operation 602 and concluding with a terminate operation 626. The read-on-arrival process 600 is illustrated below as reading a single data segment located on a single track 306 of a disc 108 in accordance with an exemplary embodiment of the present invention. However, the read-on-arrival process 600 may be administered multiple times to read data located on multiple tracks 306 on any number of discs 108 in a disc drive 100. The read-on-arrival process 600 is initiated at the start operation 602 following issuance of a read command by the host computer 200. The read-on-arrival process 600 is therefore executed to read the first data segment requested by the command in this exemplary embodiment.

In accordance with an embodiment, the read command requests retrieval of at least one data segment. The data segment may be a data segment belonging to a data file. The read command specifies the area on a particular track 306 where the data segment is stored, i.e., the target area 1100, as well as the target sector 1102 and the end sector 1104 that store the first and last blocks of the data segment, respectively. In accordance with this embodiment, the read command also specifies a recommended amount of pre-fetch and post-fetch data adjacent to the target sector 1102 and the end sector 1104, respectively, that may be retrieved as the transducer 118 is waiting to access one or more sectors 322 storing data blocks of the data segment that, at a given point in time, contain data blocks which have not been read into the buffer 206. From the start operation 602, the operation flow passes, at a given point in time, to an access operation 604.

The access operation 604 moves the actuator arms 114 to position the appropriate transducer 118 over the track 306 storing the requested data segment. This track 306 is referred to as the "target track" because it is the track 306 on the disc 108 to which the transducer 118 is moved by the access operation 604. The region of the track 306 containing the requested data segment is referred to as the target area 1100 and the first sector 322 of the target area 1100 is referred to as the target sector 1102. The access operation 604 positions the transducer 118 at a landing sector 1114 on the disc 108. The landing sector 1114 is located either before or after the target sector 1102 with respect to sequential ordering of the sectors 322 on the track 306. Alternatively, the landing sector 1114 may be the target sector 1102. In accordance with an embodiment, the access operation 604 is implemented by the servo control module 228 under control of the microprocessor 216. After the transducer 118 is positioned directly over the target track 306, the operation flow passes to a read operation 606.

The read operation 606 controls the formatter 214 such that the data block stored on the landing sector 1114 is read through the read/write channel 220 into a buffer sector in the buffer 206. From the read operation 606, the operation flow passes to a position query operation 608. The position query operation 608 determines the position of the landing sector 1114 relative to the target sector 1102. If the sequential order of the landing sector 1114 is greater than the sequential order of the target sector 1102, then the landing sector 1114 actually follows, or is said to be behind, the target sector 1102. Otherwise, if the sequential order of the landing sector 1114 is less than the sequential order of the target sector 1102, then the landing sector 1114 is located before the target sector 1102.

If the position query operation 608 determines that the sequential order of the landing sector 1114 is not greater than the sequential order of the target sector 1102, the operation flow branches "no" to a first end query operation 610. This may occur if either (1) the landing sector 1114 is the target sector 1102; or (2) the landing sector 1114 is located in sequential order prior to the target sector 1102. The first end query operation 610 serves as a loop that determines when the read element of the transducer 118 has accessed, and thus read a data block from, the end sector 1108 of the post-fetch data portion 1112. Once the data block stored on the end sector 1108 of the post-fetch data portion 1112 has been read from the disc 108 into the buffer 206, the first end query operation 610 passes the operation flow to a first stop read operation 612. The first stop read operation 612 directs the formatter 214 to disable the transfer of data from the disc 108 into the buffer 206. From the first stop read operation 612, the operation flow concludes with the terminate operation 626.

If the position query operation 608 determines that the sequential order of the landing sector 1114 is greater than the sequential order of the target sector 1102, the operation flow branches "yes" to the second end query operation 614. This occurs only if the landing sector 1114 is located in sequential order after the target sector 1102. The second end query operation 614 serves as a loop that determines when the read element of the transducer 118 has accessed, and thus read a data block from, the end sector 1108 of post-fetch data portion 1112 that is to be transferred to the buffer 206 pursuant to the read command. Once the data block stored on the end sector 1108 of the post-fetch data portion 1112 has been read from the disc 108 into the buffer 206, the second end query operation 614 passes the operation flow to a second stop read operation 616. The second stop read operation 616 directs the formatter 214 to disable the transfer of data from the disc 108 into the buffer 206. As such, the data block stored on the sector 322 immediately following the end sector 1108 of the post-fetch data portion 1112 is not read from the disc 108 to the buffer 206. From the second stop read operation 616, the operation flow passes to a pre-fetch target query operation 618.

The pre-fetch target query operation 618 serves as a loop that determines when the read element of the transducer 118 has accessed the pre-fetch target sector 1106. Once the pre-fetch target sector 1106 has been accessed by the transducer 118, the operation flow passes to a continue read operation 620. The continue read operation 620 directs the formatter 214 to enable the transfer of data between the disc 108 and the buffer 206. The first data block read per the continue read operation 620 is thus the data block stored on the pre-fetch target sector 1106. After the formatter 214 has enabled the transfer of data from the disc 108 to the buffer 206, the operation flow passes to a stop query operation 622.

The stop query operation 622 serves as a loop that determines when the read element of the transducer 118 has accessed, and thus read a data block from, the data sector 322 immediately preceding the landing sector 1114 in sequential order. For example, if the landing sector 1114 is sector twenty, then the sector 322 immediately preceding the landing sector would be sector nineteen. For simplicity, this sector 322 is referred to as the "landing-1" sector 322. Once the data block stored on the "landing-1" sector 322 has been read from the disc 108 into the buffer 206, the stop query operation 622 passes the operation flow to the first stop read operation 612. The first stop read operation 612 directs the formatter 214 to disable the transfer of data from the disc 108 into the buffer 206. As such, the data block stored on the landing sector 1114 is not re-transferred from the disc 108 to the buffer 206. Indeed, this data block was the first block read during the read-on arrival process 600. From the first stop read operation 612, the operation flow concludes at the terminate operation 626. Following the terminate operation 626, subsequent data segments may be read using the read-on-arrival process 600, thereby satisfying the read command by reading all data segments of a particular file in a specified sequential order.

Figure 7:
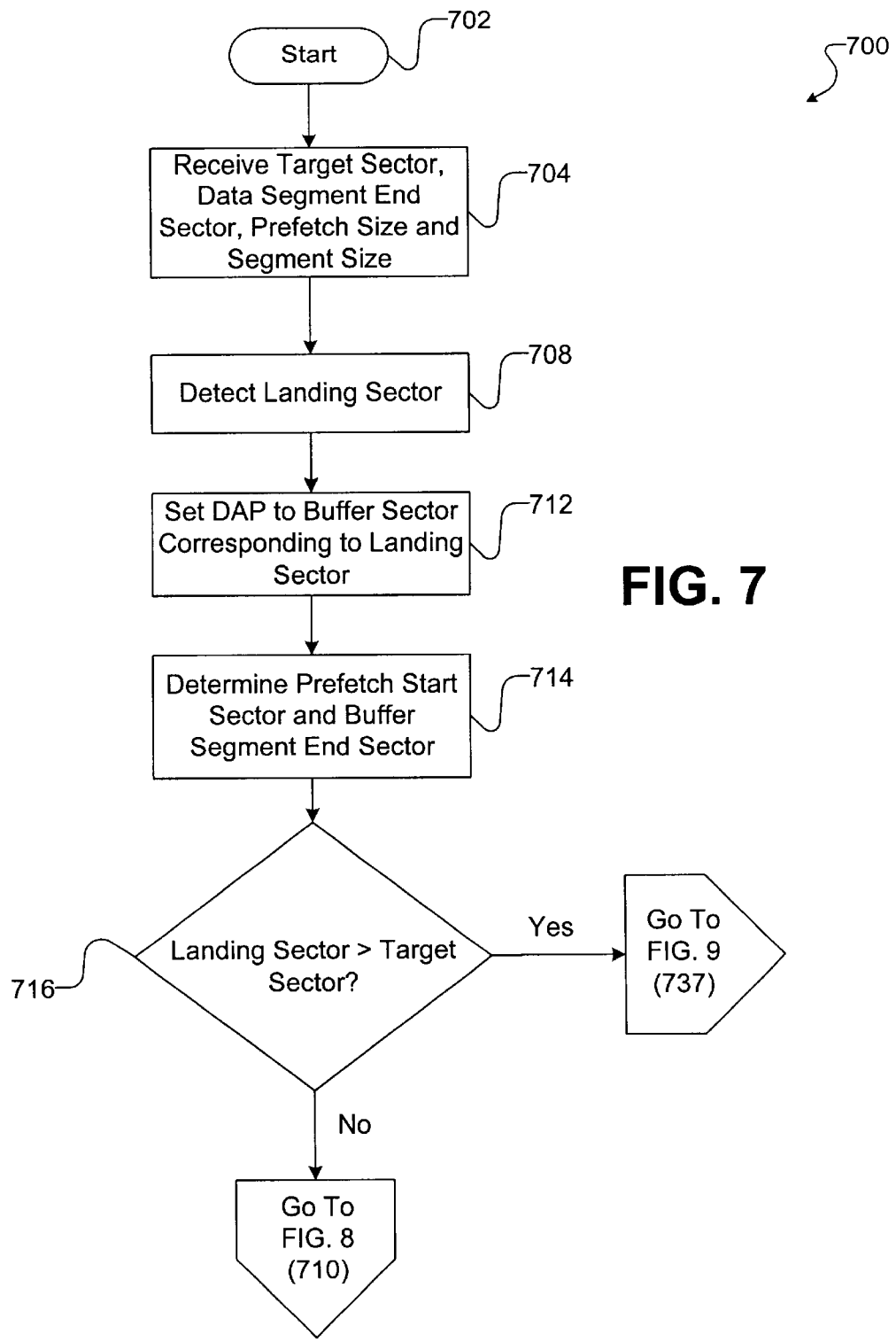
FIG. 7 is a flow diagram that illustrates operations for a process of reading data stored on a track of a data storage disc using various components of the interface shown in FIG. 2 in accordance with an embodiment of the present invention.
Figure 8:
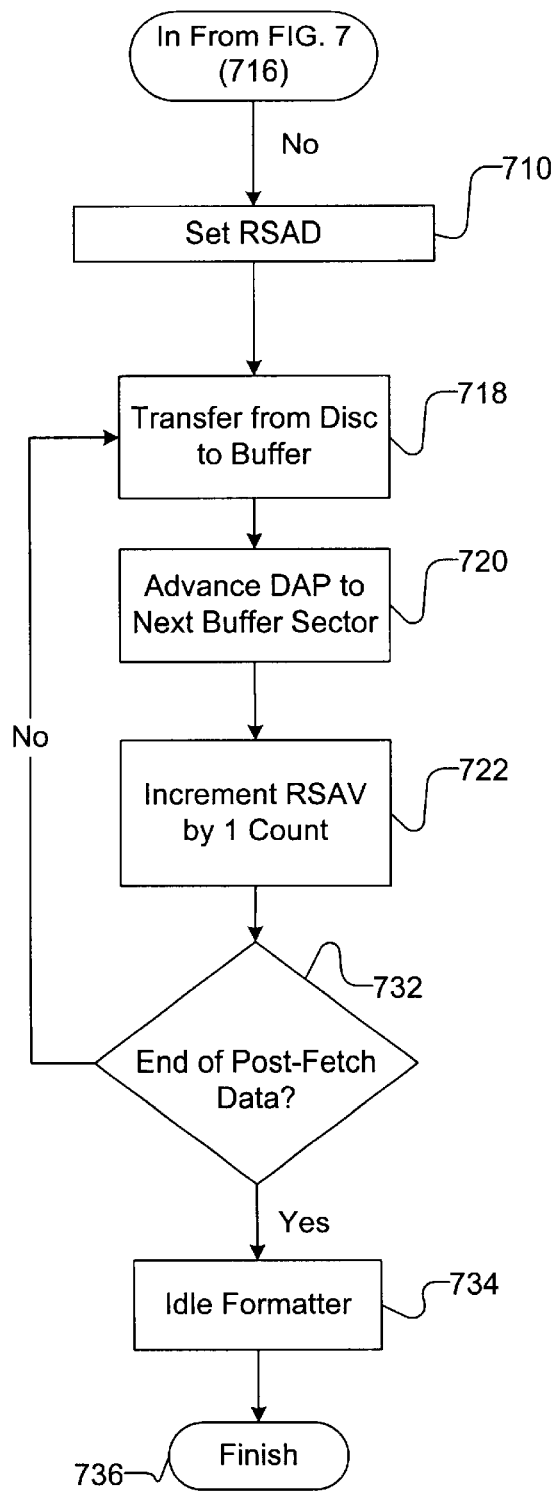
FIG. 8 is a flow diagram that illustrates operations of the process of FIG. 7 as a transducer initially accesses a sector on the track that is sequentially arranged before a predetermined target sector.
Figure 9:
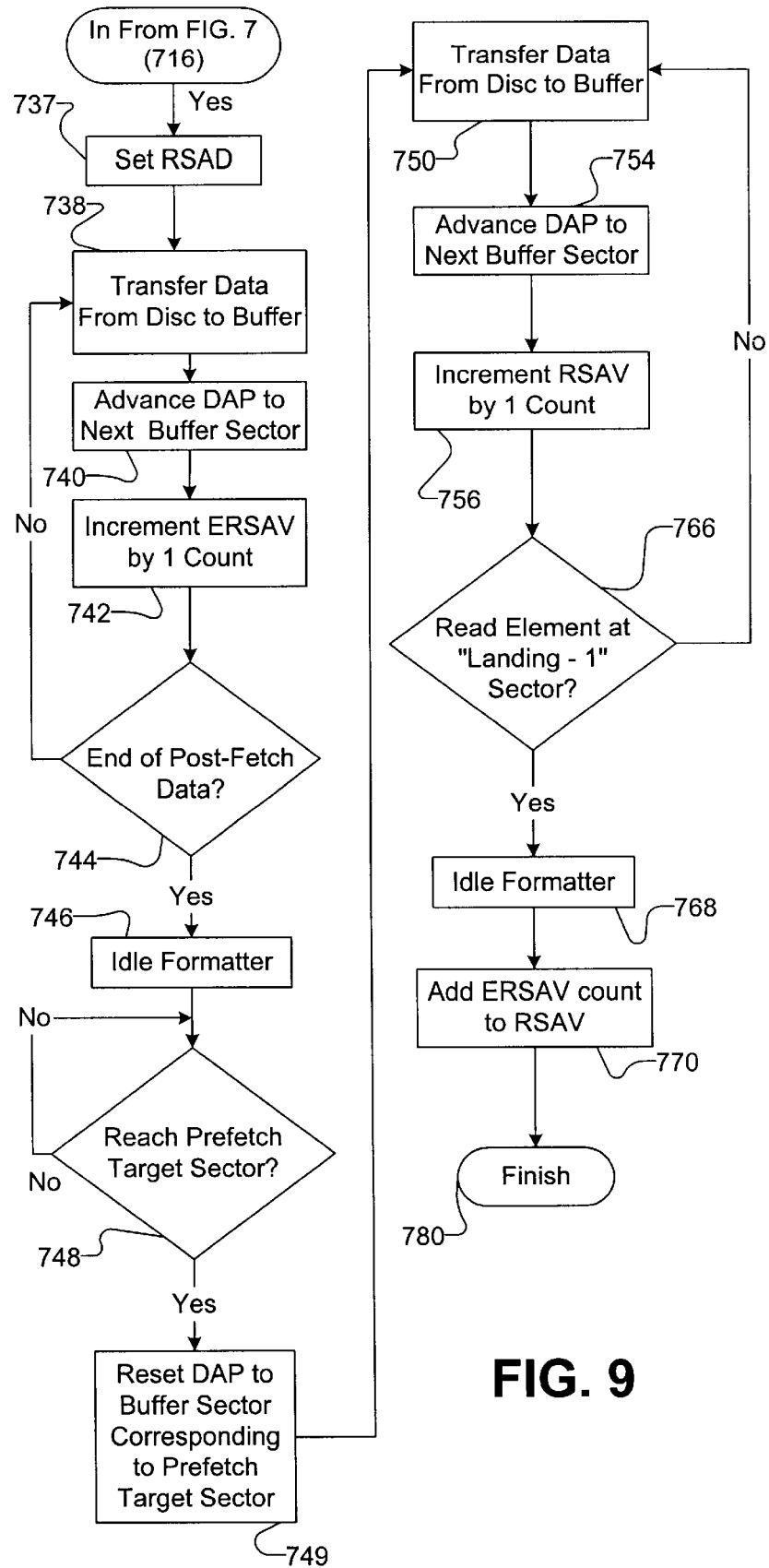
FIG. 9 is a flow diagram that illustrates operations of the process of FIG. 7 as a transducer initially accesses a sector on the track that is sequentially arranged after a predetermined target sector.

FIGS. 7, 8 and 9 illustrate operations of a read-on-arrival process 700, such as the process 600, that uses various components of the interface 202 to read a data segment stored on a disc 108 in accordance with an embodiment of the present invention. Because FIGS. 7, 8 and 9 illustrate the same read-on-arrival process 700, but in different stages of the process 700, these figures are described in tandem. Whereas FIG. 8 illustrates the read-on-arrival process 700 as the transducer 118 arrives to the target track 306 at a position before the target sector 1102, FIG. 9 illustrates the read-on-arrival process 700 as the transducer 118 arrives to the target track 306 at a position after the target sector 1102. The read-on-arrival process 700 comprises an operation flow beginning with a start operation 702 and concluding with either a first terminate operation 736 (FIG. 8) or a second terminate operation 780 (FIG. 9).

The read-on-arrival process 700 is illustrated below as reading a single data segment located on a single track 306 of a disc 108 in accordance with an exemplary embodiment of the present invention. However, the read-on-arrival process 700 may be administered multiple times to read data located on multiple tracks 306 on any number of discs 108 in a disc drive 100. The read-on-arrival process 700 is initiated at the start operation 702 following issuance of a read command by the host computer 200. The read-on-arrival process 700 is therefore executed to read the first data segment requested by the command in accordance with this exemplary embodiment. From the start operation 702, the operation flow passes to a receive parameters operation 704.

The receive parameters operation 704 receives various parameters associated with data requested in the read command. In accordance with an embodiment, the read command requests retrieval of at least one data segment. The read command specifies, and the receive parameters operation 704 receives, parameters specifying the size of the data segment requested by the command as well as the sequential order, i.e., physical block address (PBA) of the target sector 1102 and the end sector 1104 that store the first and last blocks of the data segment, respectively. The receive parameters operation 704 also receives parameters specifying a recommended amount of pre-fetch and post-fetch data adjacent to the target sector 1102 and the end sector 1104, respectively, that may be retrieved as the transducer 118 waits to access one or more sectors 322 that store data blocks of the data segment that have not yet been read into the buffer 206. From the receive parameters operation 704, the operation flow passes to a detect landing sector operation 708. The detect landing sector operation 708 detects the sector 322 on the target track 306 where the transducer 118 first arrived, i.e., the landing sector 1114. From the detect landing sector operation 708, the operation flow passes to a set DAP operation 712.

The set DAP operation 712 sets the disc address pointer 414 to point to the buffer sector that corresponds to the location in the buffer 206 where the data block stored in the landing sector 1114 is to be placed. From the set DAP operation 712, the operation flow passes to a calculate parameters operation 714. The calculate parameters operation 714 calculates a pre-fetch target sector 1106 and a post-fetch end sector 1108. The pre-fetch target sector 1106 is the data sector 322 on the target track 306 that stores the first block of pre-fetch data included in the pre-fetch data portion 1110 recommended for retrieval by the read command. The calculate parameters operation 714 determines the pre-fetch target sector 1106 by subtracting the size, in data blocks, of the recommended pre-fetch data portion 1110 from the sequential order of the target sector 1102. The post-fetch end sector 1108 is the data sector 322 on the target track 306 that stores the last block of post-fetch data included in the post-fetch data portion 1112 recommended for retrieval by the read command. The calculate parameters operation 714 determines the post-fetch end sector 1108 by adding the size, in data blocks, of the recommended post-fetch data portion 1112 to the sequential order of the end sector 1104 of the target area 1100. From the calculate parameters operation 714, the operation flow passes to a position query operation 716.

The position query operation 716 determines the position of the landing sector 1114 relative to the target sector 1102. If the position query operation 716 determines that the sequential order of the landing sector 1114 is not greater than the sequential order of the target sector 1102, the operation flow branches "no" to a first set host counter operation 710. This may occur if either (1) the landing sector 1114 is the target sector 1102; or (2) the landing sector 1114 is located in sequential order before the target sector 1102. The first set host counter operation 710 sets the RSAD register 504 based on the position of the landing sector 1114 relative to the target sector 1102. Because the position query operation 716 determined that the landing sector 1114 is located on the track 306 before or at the target sector 1102, the first set host counter operation 710 sets the count of the RSAD register 504 equal to the number of sectors 322, if not zero, between the landing sector 1114 and the target sector 1102. From the first set host counter operation 710, the operation flow passes to a first data transfer operation 718.

The first data transfer operation 718 transfers a data block between the disc 108 and the buffer 206. More specifically, the data transfer operation controls the formatter 214 such that the data block stored on the data sector 322 currently accessed by the read element of the transducer 118 is read from the sector 322 into the buffer sector currently accessed by the DAP 414. As such, in the initial iteration of the operation flow, the first data transfer operation 718 reads the data block stored on the landing sector 1114 from the disc 108 and writes the data block to the buffer 206 at a sector in the buffer 206 referenced by the DAP 414. In future iterations of the operation flow, data blocks stored in other sectors 322 than the landing sector 1114 are transferred from the disc 108 to a corresponding buffer sector. From the first data transfer operation 718, the operation flow passes to an advance DAP operation 720.

The advance DAP operation 720 advances the disc address pointer 414 to the next buffer sector specified by the VBML 408. The disc address pointer 414 is thus set to direct the commission of a data block to the next buffer sector. From the advance DAP operation 720, the operation flow passes to a first disc counter increment operation 722. The first disc counter increment operation 722 increments the count of the RSAV register 500 by one. During the initial iteration of the operation flow, the count of the RSAV register 500 is null prior to the first disc counter increment operation 722. Following the first disc counter increment operation 722, the count of the RSAV register 500 is thus one. From the first disc counter increment operation 722, the operation flow passes to a first stop query operation 732. The first stop query operation 732 determines whether the read element of the transducer 118 has accessed, and thus read a data block from, the end sector 1108 of post-fetch data portion 1112.

If the first stop query operation 732 determines that the end sector 1108 of post-fetch data portion 1112 has not been accessed by the transducer 118, the operation flow passes back to the first data transfer operation 718 and continues as previously described. If the first stop query operation 732 determines that the data block stored on the end sector 1108 of post-fetch data portion 1112 has been read from the disc 108 into the buffer 206, the operation flow branches "yes" to a stop read operation 734. The stop read operation 734 disables the formatter 214 such data is not transferred from the disc 108 into the buffer 206. As such, end sector 1108 of the post-fetch portion 1112 contains the last block of data in the data segment that is to be read from the disc 108 into the buffer 206. From the stop read operation 734, the operation flow concludes at the terminate operation 736.

Referring back to the position query operation 716, if it is determined that the sequential order of the landing sector 1114 is greater than the sequential order of the target sector 1102, the operation flow branches "yes" to a second set host counter operation 737. This only occurs if the landing sector 1114 is located after the target sector 1102 on the target track 306. Because the landing sector 1114 is located on the track 306 after the target sector 1102, the second set host counter operation 737 sets the count of the RSAD register 504 equal to the number of pre-fetch sectors 322 specified by the pre-fetch data parameter that is received by the parameters receive operation 704. From the second set host counter operation 737, the operation flow passes to second data transfer operation 738.

The second data transfer operation 738 transfers a data block between the disc 108 and the buffer 206. More specifically, the data transfer operation 738 controls the formatter 214 such that the data block stored on the data sector 322 currently accessed by the read element of the transducer 118 is read from the data sector 322 into the buffer sector currently accessed by the disc address pointer 414. As such, in the initial iteration of the operation flow, the second data transfer operation 738 reads the data block stored on the landing sector 1114 from the disc 108 and writes that data block to the buffer 206 at a sector in the buffer 206 referenced by the DAP 414. In future iterations of the operation flow, data blocks stored in other sectors 322 than the landing sector 1114 are transferred from the disc 108 to a corresponding buffer sector. From the second data transfer operation 738, the operation flow passes to a second advance DAP operation 740.

The second advance DAP operation 740 advances the disc address pointer 414 to the next buffer sector specified by the VBML 408. The disc address pointer 414 is thus set to direct the commission of a data block to the next buffer sector. From the second advance DAP operation 740, the operation flow passes to an increment ERSAV operation 742. The increment ERSAV operation 742 increments the count of the ERSAV register 502 by one. During the initial iteration of the operation flow, the count of the ERSAV register 502 is null prior to the increment ERSAV operation 742. Following the increment ERSAV operation 742, the count of the ERSAV register 502 is thus one. From the increment ERSAV operation 742, the operation flow passes to a post-fetch end sector query operation 744. The post-fetch end sector query operation 744 determines whether the read element of the transducer 118 has accessed, and thus read a data block from, the end sector 1108 of the post-fetch data portion 1112 recommended for retrieval by the read command.

If the post-fetch end sector query operation 744 determines that the end sector 1108 of the post-fetch data portion 1112 has not yet been accessed, the operation flow returns to the second data transfer operation 738 and continues as previously described. Else, if the post-fetch end sector query operation 744 determines that the data block stored on the end sector 1108 of the post-fetch data portion 1112 has been read from the disc 108 into the buffer 206, the operation flow passes to a pause read operation 746. The pause read operation 746 disables the formatter 214 such data is not transferred from the disc 108 into the buffer 206. From the pause read operation 746, the operation flow passes to a pre-fetch target query operation 748.

The pre-fetch target query operation 748 serves as a loop that determines when the read element of the transducer 118 has accessed the pre-fetch target sector 1106, which was calculated by the calculate parameters operation 714. Once the pre-fetch target sector 1106 has been accessed by the transducer 118, pre-fetch target query operation 748 branches the operation flow to a reset DAP operation 749. The reset DAP operation 749 sets the disc address pointer 414 to point to the buffer sector that corresponds to the location in the buffer 206 where the data block stored in the pre-fetch target sector 1106 is to be placed. From the reset DAP operation 749, the operation flow passes to a continue read operation 750.

The continue read operation 750 controls the formatter 214 such that the transfer of data between the disc 108 and the buffer 206 is enabled. More specifically, the continue read operation 750 directs the formatter 214 to enable the transfer of the data block stored on the data sector 322 currently accessed by the read element of the transducer 118 to the buffer sector currently accessed by the disc address pointer 414. As such, in the initial iteration of the operation flow, the continue read operation 750 transfers the data block stored on the prefetch target sector 1106 from the disc 108 and writes that data block to the buffer 206 at a sector in the buffer 206 referenced by the disc address pointer 414. In future iterations of the operation flow, data blocks stored in other sectors 322 than the pre-fetch target sector 1106 are transferred from the disc 108 to a corresponding buffer sector. From the continue read operation 750, the operation flow passes to a third advance DAP operation 754.

The third advance DAP operation 754 advances the disc address pointer 414 to the next buffer sector specified by the VBML 408. The disc address pointer 414 is thus set to direct the commission of a data block to the next buffer sector. From the third advance DAP operation 754, the operation flow passes to a second disc counter increment operation 756. The second disc counter increment operation 756 increments the count of the RSAV register 500 by one. During the initial iteration of the operation flow, the count of the RSAV register 500 is null prior to the second disc counter increment operation 756. Following the second disc counter increment operation 756, the count of the RSAV register 500 is thus one. From the second disc counter increment operation 756, the operation flow passes to a second stop query operation 766. The second stop query operation 766 determines whether the read element of the transducer 118 has accessed, and thus read a data block from, the data sector 322 immediately before the landing sector 1114 in sequential order. As noted with reference to FIG. 6, this sector 322 is referred to herein as the "landing-1" sector.

If the second stop query operation 766 determines that the "landing-1" sector 322 of the target area 1100 has not been accessed by the transducer 118, the operation flow passes back to the continue read operation 750 and continues as previously described. If the second stop query operation 766 determines that the data block stored on the "landing-1" sector 322 has been read from the disc 108 into the buffer 206, the second stop query operation 766 passes the operation flow to a second stop read operation 768. The second stop read operation 768 disables the formatter 214 such data is not transferred from the disc 108 into the buffer 206. As such, the "landing-1" sector 322 contains the last block of data in the data segment that is to be read from the disc 108 into the buffer 206. From the second stop read operation 768, the operation flow passes to an add operation 770. The add operation 770 adds the count of the ERSAV register 502 into the count of the RSAV register 500. From the add operation 770, the operation flow concludes at the terminate operation 780.

Figure 10:
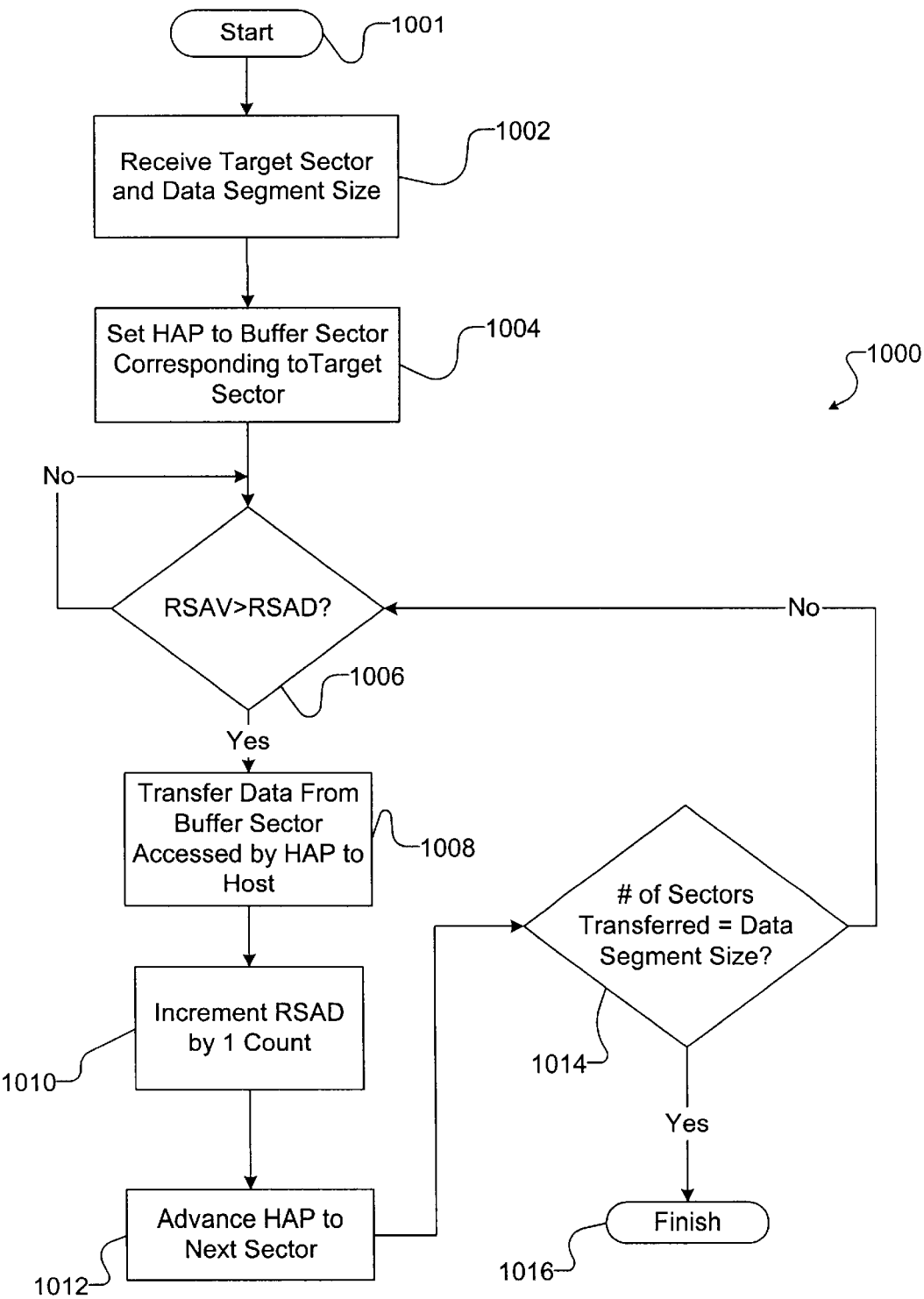
FIG. 10 is a flow diagram that illustrates operations for transferring data stored in buffer memory to a host computer in accordance with an embodiment of the present invention.

FIG. 10 illustrates operations for transferring data stored in the buffer memory 206 to the host computer 200 using the HAP 412 of the buffer manager 408 in accordance with an embodiment of the present invention. The operations shown in FIG. 10 collectively form a buffer-host transfer process 1000. In accordance with an embodiment, the buffer-host transfer process 1000 is performed in parallel to, i.e., substantially simultaneous to, the read-on-arrival process 700 illustrated in FIGS. 7, 8 and 9. Such parallel performance is based on the dependency of the buffer-host transfer process 1000 to the count of the RSAV register 500 and the RSAD register 504, as noted below in the transfer query operation 1006. The buffer-host transfer process 1000 is performed by an operation flow beginning with a start operation 1001 and concluding with a terminate operation 1016.

In accordance with an embodiment of the present invention, the buffer-host transfer process 1000 is initiated at the start operation 1001 following issuance of a read command by the host computer 200. The read command may, and typically does, request transfer of multiple data segments from the buffer 206 to the host computer 200. As with the read-on-arrival process 700, the buffer-host transfer process 1000 is illustrated below as transferring a single data segment requested by the read command and stored in the buffer 206 in accordance with an exemplary embodiment of the present invention. However, the buffer-host transfer process 1000 may be administered multiple times to transfer multiple data segments from the buffer 206 to the host computer 200, as typically requested by the read command. The buffer-host transfer process 1000 is therefore executed to read the first data segment requested by the read command in accordance with this exemplary embodiment. From the start operation 1001, the operation flow passes to a receive parameters operation 1002.

The receive parameters operation 1002 receives various parameters associated with data requested in the read command. In accordance with an embodiment, the read command requests retrieval of at least one data segment. The read command specifies, and the receive parameters operation 1002 receives, parameters specifying the size of the data segment requested by the command as well as the sequential order, i.e., physical block address (PBA) of the target sector 1102 and the end sector 1104 that store the first and last blocks of the data segment, respectively. From the receive parameters operation 1002, the operation flow passes to a set HAP operation 1004.

The set HAP operation 1004 sets the host address pointer 412 of the buffer manager 408 to point to the buffer sector that corresponds to location in the buffer 206 where the data block stored in the target sector 1102 is to be placed. From the set HAP operation 1004, the operation flow passes to a host transfer query operation 1006. The host transfer query operation 1006 serves as a loop that determines when the count of the RSAV register 500 is greater than the count of the RSAD register 504. Once the count of the RSAV register 500 is greater than the count of the RSAD register 504, the operation flow passes to a host transfer operation 1008. The host transfer operation 1008 transfers the data block stored in the buffer sector accessed by the host address pointer 412 from the buffer 206 to the host computer 200. From the host transfer operation 1008, the operation flow passes to a host counter increment operation 1010.

The host counter increment operation 1010 increments the count of the RSAD register 504 by one. From the host counter increment operation 1010, the operation flow passes to an HAP advance operation 1012. The HAP advance operation 1012 advances the host address pointer 412 to the next buffer sector specified by the VBML 408. The host address pointer 412 is thus set to direct the host computer 200 to retrieve the next data block of the segment from the next buffer sector. From the HAP advance operation 1012, the operation flow passes to a segment transfer complete query operation 1014.

The segment transfer complete query operation 1014 determines whether all data blocks of the data segment have been transferred from the buffer memory 206 to the host computer 200. If the segment transfer complete query operation 1014 determines that all data blocks have been transferred from the buffer memory 206 to the host computer 200, the operation flow concludes at the terminate operation 1016. In contrast, if the segment transfer complete query operation 1014 determines that all data blocks have not been transferred from the buffer memory 206 to the host computer 200, the operation flow passes back to the host transfer query operation 1006 and continues as previously described.

In accordance with an embodiment, the segment transfer complete query operation 1014 uses a counter to render this determination. In accordance with an embodiment, this counter may be substantially similar to the RSAD register 504, but without the functionality to offset the count. In this embodiment, the counter is set to a count of zero at the start operation 1001. As the host transfer operation 1008 transfers a block of data to the host computer 200, the count of the counter is incremented by one. The segment transfer complete query operation 1014 compares the count of this counter to the data segment size in order to render a conclusion as to whether all data blocks of the data segment have been transferred from the buffer memory 206 to the host computer 200. If the count of this counter equals the data segment size, the operation flow concludes at the terminate operation 1016. In contrast, if the count of this counter has not reached the data segment size, the operation flow passes back to the host transfer query operation 1006 and continues as previously described.

In summary, the present invention may be viewed as a method (such as in operations 600) performed in a disc drive (such as 100) for transferring data between an external environment (such as 200) and a transducer (such as 118) accessing a track (such as 306) of sequentially arranged data sectors (such as 322) on a rotating data storage disc (such as 108). The data read from the disc by the transducer is placed in a buffer memory (such as 206) for subsequent transfer to the external environment. The method begins with an act of receiving (such as in operation 704) a read command issued by the external environment. The read command specifies a target sector (such as 1102) as a beginning sector storing a first data block of a data segment to be read on the track. The method continues with an act of reading (such as in operation 606) a first portion (such as 1100 and 1012) of the data segment as the transducer accesses one or more data sectors on the track beginning with an initial sector (such as 1114) located on the track sequentially following the target sector and ending at an end sector (such as 1104 and 1108) as the disc rotates under the transducer in a predetermined direction. The method then continues with an act of waiting (such as in operation 1118) for the transducer to access an index sector (such as 1102 and 1106) as the disc rotates under the transducer in the predetermined direction. Finally, the method concludes with an act of reading (such as in operation 620) a second portion (such as 1100 and 1110) of the data segment as the transducer accesses one or more data sectors on the track beginning with the index sector and ending at a stop sector (such as 322) adjacent to and sequentially preceding the initial sector as the disc rotates under the transducer in the predetermined direction. The target sector is included in the one or more data sectors accessed by the transducer as the transducer reads the second portion of the data segment.

In accordance with another embodiment, the method may include an act of transferring (such as in operation 1008) data blocks of the data segment from the buffer memory to the external environment after the transducer reads a data block stored on the target sector. In this embodiment, the method may further include an act of setting (such as in operations 710 and 737) a host counter (such as 504) to a count equal to a difference between a sequential address assigned to the index sector and a sequential address assigned to the target sector. As such, the method of this embodiment further includes an act of counting (such as in operations 742) with a first disc counter (such as 502) a number of data blocks transferred between the disc and the buffer memory as the transducer accesses the one or more data sectors on the track beginning with the initial sector and ending at the end sector. The number counted by the first disc counter is recorded as a first transfer count. The method of this embodiment still further includes an act of counting (such as in operations 722, 742 and 756) with a second disc counter (such as 500) a number of data blocks transferred between the disc and the buffer memory as the transducer accesses the one or more data sectors on the track beginning with the index sector and ending at the stop sector. The number counted by the second disc counter is recorded as a second transfer count. In accordance with this embodiment, the transferring act (e) may include an act of moving (such as in operation 1008) a data block between the buffer memory and the external environment if the second transfer count is greater than the count of the host counter. Furthermore, the method includes incrementing (such as in operation 1010) the count of the host counter by one with each data block transferred from the buffer memory to the external environment. The first transfer count is added into the second transfer count after the transducer has completed transferring data stored on the second portion of the data segment to the buffer memory.

In accordance with yet another embodiment wherein the method includes an act of transferring data blocks of the data segment from the buffer memory to the external environment after the transducer reads a data block stored on the target sector, the buffer memory may be divided into buffer sectors operable to store blocks of data. As such, the method may include maintaining (such as in operation 764) a buffer manager list (such as 408) that indicates an order in which data blocks are to be extracted from the buffer sectors for transfer to the external environment. In accordance with this embodiment, the buffer manager list is a singly-linked list of next buffer sector locations. In this embodiment, the transferring act (e) may include an act of extracting (such as in operation 1008) data blocks of the data segment from sectors of the buffer memory in the order indicated by the buffer manager list.

In accordance with another embodiment, the buffer memory may be divided into buffer sectors operable to store blocks of data. In this embodiment, the method of the present invention may include an act of maintaining (such as in operation 740, 754 and 720) a buffer manager list (such as 408) that indicates an order in which data blocks are to be placed in the buffer memory from the disc. In accordance with this embodiment, the buffer manager list is a singly-linked list of next buffer sector locations. In this embodiment, the reading act (such as in operation 606) includes placing (such as in operations 738 and 750) data blocks read as the transducer accesses the track beginning with the initial sector and ending with the end sector into sectors of the buffer memory in the order indicated by the buffer manager list. Likewise, the reading act (such as in operation 620) includes placing data blocks read as the transducer accesses the track beginning with the index sector and ending with the stop sector into sectors of the buffer memory in the order indicated by the buffer manager list.

In accordance with yet further embodiments, the initial sector and the end sector may both store a data block of the data segment. Alternatively, the initial sector may store a data block of the data segment and the end sector may store a data block of post-fetch data. In this alternative embodiment, the index sector may store a data block of pre-fetch data. In accordance with yet another alternative embodiment, the index sector may be the target sector. The external environment may include a host computer.

The present invention may also be viewed as a program storage device (such as 108) readable by a computer system tangibly embodying a program of instructions executable by the computer system to perform the method (such as in operation 600) for transferring data between an external environment (such as 200) and a transducer (such as 118) accessing a track (such as 306) of sequentially arranged data sectors (such as 322) on a rotating data storage disc (such as 108).

In accordance with another embodiment, the present invention may be viewed as a method (such as in operations 700) performed in a disc drive (such as 100) for controlling a transfer of data between an external environment (such as 200) and a transducer (such as 118) accessing a track (such as 306) of sequentially arranged data sectors (such as 322) on a rotating data storage disc (such as 108). The method includes an act of receiving (such as in operation 704) a read command issued by the external environment. The read command requests retrieval of a data segment stored on a target area (such as 1100) of the track and beginning with a data block stored on a specified target sector (such as 1102), pre-fetch data stored on a specified pre-fetch portion (such as 1110) on the track and post-fetch data stored on a specified post-fetch portion (such as 1112) on the track. The method further includes an act of enabling (such as in operations 718 and 738) the transfer of data from the disc to the buffer beginning as the transducer accesses an initial sector (such as 1114) on the track such that data blocks stored on the initial sector and one or more sectors accessed by the transducer thereafter are read and provided to the buffer.

If the initial sector follows the target sector in sequential arrangement, the method includes an act of disabling (such as in operation 746) the transfer of data from the disc to the buffer after the transducer accesses and reads data stored on an end sector (such as 1108) of the post-fetch data portion. Under this condition, i.e., the initial sector following the target sector, the method also includes an act of enabling (such as in operation 750) the transfer of data from the disc to the buffer as the transducer accesses a pre-fetch target sector of the specified pre-fetch data portion such that data blocks stored on the pre-fetch target sector and one or more sectors accessed by the transducer thereafter are read and provided to the buffer. Furthermore, under this condition, i.e., the initial sector following the target sector, the method includes an act of disabling (such as in operation 768) the transfer of data from the disc to the buffer as the transducer accesses and reads data stored on a data sector adjacent to and sequentially preceding the initial sector.

If the initial sector is located before the target sector in sequential arrangement, the method includes an act of disabling (such as in operation 734) the transfer of data from the disc to the buffer after the transducer accesses and reads data stored on an end sector storing a final data block of the data segment. In accordance with an embodiment, a disc counter (such as 500) monitors the transfer of data between the disc and the buffer to count a number of data blocks transferred therebetween. In this embodiment, the method includes an act of setting (such as in operations 710 and 737) a host counter (such as 504) to a count equal to a difference in an address assigned to the target sector and an address assigned to the initial sector. Further, the method includes an act of enabling (such as in operation 1008) and the transfer of data between the buffer and the external environment if a count of the disc counter is-greater than the count of the host counter. The method also further comprises an act of incrementing (such as in operations 1010) the count of the host counter by one with each data block transferred from the buffer to the external environment.

The present invention may also be viewed as a program storage device (such as 108) readable by a computer system tangibly embodying a program of instructions executable by the computer system to perform the method (such as in operation 600) for controlling a transfer of data between an external environment (such as 200) and a transducer (such as 118) accessing a track (such as 306) of sequentially arranged data sectors (such as 322) on a rotating data storage disc (such as 108).

In accordance with yet another embodiment, the present invention may be viewed as a disc drive (such as 100) having a data storage disc (such as 108) having a track (such as 306) of sequentially arranged data sectors (such as 322). Data blocks of a segment are stored on a plurality of the data sectors. The disc drive also includes a buffer (such as 206) having sequentially arranged buffer sectors for storing the data blocks of the segment for subsequent transfer to a host computer (such as 200) and a transducer (such as 118). The transducer reads a first portion of the segment stored on the track on a first plurality of data sectors (such as 1100 and 1112) and a second portion of the segment on a second plurality of data sectors (such as 1100 and 1110). The second plurality of data sectors are sequentially arranged on the track after the first plurality of data sectors. The disc drive (such as 100) also includes a read/write channel (such as 220) receiving the first portion and the second portion of the data segment read from the disc by the transducer and an interface (such as 202) operably coupled between the read/write channel and the buffer to transmit data read through the read/write channel to the buffer sectors of the buffer. The disc drive further includes means for timing (such as 214) when data is transmitted between the transducer and the buffer such that the second plurality of data sectors is transferred to the buffer prior to the first plurality of data sectors being transmitted to the buffer.

In accordance with an embodiment, the disc drive may include means for enabling (such as 210) a transfer of data blocks of the first portion of the segment stored in buffer sectors to the host computer after each data block of the first portion is transmitted to the buffer. In this embodiment, the enabling means may include means (such as 500, 502 and 504) for enabling a transfer of data blocks of the second portion of the segment stored in buffer sectors to the host computer after all data blocks of the first portion are transmitted to the buffer.

In accordance with yet another embodiment, the disc drive may include means for ordering (such as 208) the transfer of the data blocks of the first portion and the second from the buffer sectors to the host computer in a predetermined sequence. Likewise, the disc drive may include means (such as 208) for ordering placement of the data blocks of the first portion and the second into the buffer sectors in a predetermined sequence. In accordance with an embodiment, the segment of data blocks includes a data segment requested for retrieval in a read command issued by the host computer. In this embodiment, the segment of data blocks also includes post-fetch data, wherein the post-fetch data is stored on the second plurality of data sectors, and pre-fetch data, wherein the pre-fetch data is stored on the first plurality of data sectors.

Although the invention has been described and illustrated with a certain degree of particularity, it is understood that the present disclosure has been made only by way of example, and that numerous changes, combinations, and arrangements of techniques can be resorted to by those skilled in the art without departing from the spirit and scope of the invention as claimed below. For example, in a case where the segment of the buffer 206 to which data is being transferred is smaller than the size of the track 306 on which the data is committed, a hardware register is used to denote the specific sector 332 on the track 306 that stores the final block (512 bytes) of data of the buffer segment, i.e., the data segment, the pre-fetch data and the post-fetch data. The hardware register ensures that the pre-fetch data, which is data requested by the host computer 200, is not overwritten. Accordingly, once the disc address pointer 414 references the buffer sector corresponding to the end sector 322 for post-fetch data portion 1112, the next sector is loaded to reference the buffer sector corresponding to the pre-fetch target sector 1106. In accordance with another embodiment, the interface 202 may be built to include a skip mask (not shown) operably coupled to the formatter 214. The skip mask provides memory storage, such as registers, which contain transfer and don't transfer information for block of data that is passing through the formatter 214. For example, a series of registers in the skip mask may contain either binary ones or zeros, wherein a "1" indicates that a data block should not be allowed to pass through the formatter and a "0" indicates that a data block should be allowed to pass through the formatter 214. As such, as a read or write to a particular track 306 is being carried out, the values in the skip mask registers will indicate which of the data blocks in the transfer should and should not be allowed to pass through the formatter 214. The formatter 214 may therefore skip selected sectors 322 in an otherwise contiguous read or write operation during a single read or write operation or revolution of the disc 108. The skip mask allows the formatter 214 to disable, or skip, reading data from sectors 322 on the disc 108 during an access without slipping revolutions. In sum, the skip mask is responsible for specifying whether data is to be read from each sector 322 as each sector 322 is accessed, or detected, by the transducer 118.

What is claimed is:

1. A method for transferring data between a rotating data storage disc and an external environment via a transducer accessing sequentially arranged data sectors on a track on the data storage disc, wherein data read from the disc by the transducer is placed in a buffer memory, the method comprising:

(a) receiving a read command specifying a target sector as a beginning sector storing a first data block of a data segment to be read;

(b) reading a first portion of the data segment as the transducer accesses one or more data sectors on the track beginning with an initial sector located on the track sequentially following the target sector and ending at an end sector as the disc rotates under the transducer in a predetermined direction;

(c) waiting for the transducer to access an index sector as the disc rotates under the transducer in the predetermined direction;

(d) reading a second portion of the data segment as the transducer accesses another one or more data sectors on the track beginning with the index sector and ending at a stop sector adjacent to and sequentially preceding the initial sector as the disc rotates under the transducer in the predetermined direction such that the target sector is included in the one or more data sectors accessed by the transducer as the transducer reads the second portion of the data segment; and (e) transferring data blocks of the data segment from the buffer memory to the external environment after the transducer reads a data block stored on the target sector.

2. The method of claim 1, further comprising:

(f) setting a host counter to a count equal to a difference between a sequential address assigned to the index sector and a sequential address assigned to the target sector;

(g) counting with a first disc counter a number of data blocks transferred between the disc and the buffer memory as the transducer accesses the one or more data sectors on the track beginning with the initial sector and ending at the end sector, wherein the number counted by the first disc counter is recorded as a first transfer count; and (h) counting with a second disc counter a number of data blocks transferred between the disc and the buffer memory as the transducer accesses the other one or more data sectors on the track beginning with the index sector and ending at the stop sector, wherein the number counted by the second disc counter is recorded as a second transfer count.

3. The method of claim 2, wherein the transferring act (e) comprises:

(e)(i) moving a data block between the buffer memory and the external environment if the second transfer count is greater than the count of the host counter.

4. The method of claim 3, further comprising:

(ii) incrementing the count of the host counter by one with each data block transferred from the buffer memory to the external environment.

5. The method of claim 4, wherein the first transfer count is added into the second transfer count after the transducer has completed transferring data stored on the second portion of the data segment to the buffer memory.

6. The method of claim 1, wherein the buffer memory is divided into buffer sectors operable to store blocks of data, the method further comprising:

(f) maintaining a buffer manager list that indicates an order in which data blocks are to be extracted from the buffer sectors for transfer to the external environment, wherein the buffer manager list is a singly-linked list of next buffer sector locations.

7. The method of claim 6, wherein the transferring act (e) comprises:

extracting data blocks of the data segment from sectors of the buffer memory in the order indicated by the buffer manager list.

8. The method of claim 1, wherein the buffer memory is divided into buffer sectors operable to store blocks of data, the method further comprising:

(f) maintaining a buffer manager list that indicates an order in which data blocks are to be placed in the buffer memory from the disc, wherein the buffer manager list is a singly-linked list of next buffer sector locations.

9. The method of claim 8:

wherein the reading act (b) comprises placing data blocks read as the transducer accesses the track beginning with the initial sector and ending with the end sector into sectors of the buffer memory in the order indicated by the buffer manager list; and wherein the reading act (d) comprises placing data blocks read as the transducer accesses the track beginning with the index sector and ending with the stop sector into sectors of the buffer memory in the order indicated by the buffer manager list.

10. The method of claim 1, wherein the initial sector and the end sector store both store a data block of the data segment.

11. The method of claim 1, wherein the initial sector stores a data block of the data segment and the end sector stores a data block of post-fetch data.

12. The method of claim 11, wherein the index sector stores a data block of pre-fetch data.

13. The method of claim 1, wherein the index sector is the target sector.

14. The method of claim 1, wherein the external environment comprises a host computer.

15. A program storage device readable by a computer system tangibly embodying a program of instructions executable by the computer system to perform the method of claim 1.

16. In a disc drive, a method for controlling a transfer of data between a rotating data storage disc and an external environment via a transducer accessing sequentially arranged data sectors on a track on the data storage disc, wherein data read from the disc by the transducer is placed in a buffer memory, the method comprising:

(a) receiving a read command requesting retrieval of a data segment stored on a target area of the track and beginning with a data block stored on a specified target sector, pre-fetch data stored on a specified pre-fetch portion on the track and post-fetch data stored on a specified post-fetch portion on the track;

(b) enabling the transfer of data from the disc to the buffer beginning as the transducer accesses an initial sector on the track such that data blocks stored on the initial sector and one or more sectors accessed by the transducer thereafter are read and provided to the buffer;

(c) disabling the transfer of data from the disc to the buffer after the transducer accesses and reads data stored on an end sector of the post-fetch data portion if the initial sector follows the target sector in sequential arrangement;

(d) enabling the transfer of data from the disc to the buffer as the transducer accesses a pre-fetch target sector of the specified pre-fetch data portion such that data blocks stored on the pre-fetch target sector and one or more sectors accessed by the transducer thereafter are read and provided to the buffer;

(e) disabling the transfer of data from the disc to the buffer as the transducer accesses and reads data stored on a data sector adjacent to and sequentially preceding the initial sector;

(f) disabling the transfer of data from the disc to the buffer after the transducer accesses and reads data stored on an end sector storing a final data block of the data segment if the initial sector is located before the target sector in sequential arrangement;

(g) setting a host counter to a count equal to a difference in an address assigned to the target sector and an address assigned to the initial sector; and (h) enabling the transfer of data between the buffer and the external environment if the number counted by the disc counter is greater than the count of the host counter.

17. The method of claim 16, further comprising:

(i) incrementing the count of the host counter by one with each data block transferred from the buffer to the external environment.

18. The method of claim 16, wherein the external environment is a host computer.

19. A program storage device readable by a computer system tangibly embodying a program of instructions executable by the computer system to perform the method of claim 16.

20. A disc drive having a data storage disc with a track of sequentially arranged data sectors located thereon, wherein data blocks of a segment are stored on a plurality of the data sectors, a buffer of sequentially arranged buffer sectors for storing the data blocks of the segment for subsequent transfer to a host computer, a transducer reading a first portion of the segment stored on the track on a first plurality of data sectors and a second portion of the segment on a second plurality of data sectors, the second plurality of data sectors being sequentially arranged on the track after the first plurality of data sectors, and a read/write channel receiving the first portion and the second portion of the data segment read from the disc by the transducer, the disc drive comprising:

an interface operably coupled between the read/write channel and the buffer to transmit data read through the read/write channel to the buffer sectors of the buffer;

means for timing when data is transmitted between the transducer and the buffer such that the second plurality of data sectors is transferred to the buffer prior to the first plurality of data sectors being transmitted to the buffer; and means for counting data blocks transferred between the transducer and the buffer.

21. The disc drive of claim 20, further comprising:

means for enabling a transfer of data blocks of the first portion of the segment stored in buffer sectors to the host computer after each data block of the first portion is transmitted to the buffer.

22. The disc drive of claim 21, wherein the enabling means further comprises:

means for enabling a transfer of data blocks of the second portion of the segment stored in buffer sectors to the host computer after all data blocks of the first portion are transmitted to the buffer.

23. The disc drive of claim 22, further comprising:

means for ordering the transfer of the data blocks of the first portion and the second from the buffer sectors to the host computer in a predetermined sequence.

24. The disc drive of claim 20, further comprising:

means for ordering placement of the data blocks of the first portion and the second into the buffer sectors in a predetermined sequence.

25. The disc drive of claim 20, wherein the segment of data blocks comprises a data segment requested for retrieval in a read command issued by the host computer.

26. The disc drive of claim 21, wherein the segment of data blocks further comprises post-fetch data, wherein the post-fetch data is stored on the second plurality of data sectors.

27. The disc drive of claim 21, wherein the segment of data blocks further comprises pre-fetch data, wherein the pre-fetch data is stored on the first plurality of data sectors.

* * * * *